(12) United States Patent
Sugihara et al.

(10) Patent No.: US 7,203,561 B2
(45) Date of Patent: Apr. 10, 2007

(54) INFORMATION PROCESSING DEVICE, OPERATION STATE MANAGEMENT DEVICE, INFORMATION PROCESSING METHOD, PROGRAM, AND COMPUTER-READABLE STORAGE MEDIUM STORING PROGRAM

(75) Inventors: Shiro Sugihara, Kyoto (JP); Toru Fujii, Kyoto (JP)

(73) Assignee: Omron Corporation, Kyoto-Shi, Tokyo ( * ) Notice: Subject to any disclaimer, the term of this patent is extended or adjusted under 35 U.S.C. 154(b) by 0 days.

(21) Appl. No.: 11/260,664

(22) Filed: Oct. 28, 2005

(65) Prior Publication Data
US 2006/0100731 A1    May 11, 2006

(30) Foreign Application Priority Data
Nov. 11, 2004 (JP) ............................. 2004-328169

(51) Int. Cl.
*G06F 19/00* (2006.01)
(52) U.S. Cl. ...................................... 700/110; 702/130
(58) Field of Classification Search .................. 700/96, 700/108, 109, 110, 174, 169; 707/104.1; 702/130
See application file for complete search history.

(56) References Cited
U.S. PATENT DOCUMENTS
5,877,961 A * 3/1999 Moore ........................ 700/180

| | | | | |
|---|---|---|---|---|
| 6,751,571 | B1 * | 6/2004 | Hallett et al. | 702/130 |
| 6,961,635 | B2 * | 11/2005 | Cosci et al. | 700/108 |
| 6,963,812 | B2 * | 11/2005 | Yamaguchi et al. | 702/81 |
| 7,031,783 | B2 * | 4/2006 | O'Grady et al. | 700/96 |
| 2003/0229414 | A1 | 12/2003 | Nakazawa et al. | |
| 2006/0047705 | A1 * | 3/2006 | Reade et al. | 707/104.1 |

FOREIGN PATENT DOCUMENTS

| | | |
|---|---|---|
| JP | 2002-247504 | 8/2002 |
| JP | 2004-013686 | 1/2004 |
| JP | 2004-054701 | 2/2004 |
| JP | 2004-287577 | 10/2004 |

* cited by examiner

*Primary Examiner*—Kidest Bahta
(74) *Attorney, Agent, or Firm*—Foley & Lardner LLP

(57) ABSTRACT

An information processing device is provided for facilitating analysis of operation states of production facilities. The information processing device includes: an operation state acquisition unit that sequentially acquires operation information indicating operation of a production facility on a production line and stop information indicating stop of the facility, for each production facility; a stop cause receiving unit that receives input of stop cause information indicating a cause of stop of the production facility, for each production facility; an data association unit that associates the stop cause information at least with the stop information and stores the operation information and the associated information into a storage unit; and a display control unit that displays both the stored operation information and the associated information with respect to plural production facilities in time series on a display screen.

17 Claims, 18 Drawing Sheets

Fig.3 | TIME | 2004/08/12 11:25:34 | OUTPUT | 1

Fig.4 | TIME | 2004/08/12 11:25:39 | OUTPUT | 0

Fig.5 | TIME | 2004/08/12 11:34:54 | OUTPUT | 1

Fig.6 | TIME | 2004/08/12 11:34:59 | OUTPUT | 0

Fig.8

| TIME | OUTPUT |
|---|---|
| 2004/08/12 11:25:34 | 1 |
| 2004/08/12 11:25:35 | 1 |
| 2004/08/12 11:25:36 | 1 |
| 2004/08/12 11:25:37 | 0 |
| 2004/08/12 11:25:38 | 1 |
| 2004/08/12 11:25:39 | 1 |
| 2004/08/12 11:25:40 | 1 |
| 2004/08/12 11:25:41 | 0 |
| 2004/08/12 11:25:42 | 1 |
| 2004/08/12 11:25:43 | 1 |
| 2004/08/12 11:25:44 | 1 |
| 2004/08/12 11:25:45 | 1 |
| 2004/08/12 11:25:46 | 1 |
| 2004/08/12 11:25:47 | 1 |
| 2004/08/12 11:25:48 | 1 |
| 2004/08/12 11:25:49 | 1 |

Fig.9

| TIME | OUTPUT |
|---|---|
| 2004/08/12 11:25:34 | 1 |
| 2004/08/12 11:25:35 | 1 |
| 2004/08/12 11:25:36 | 1 |
| 2004/08/12 11:25:37 | 0 |
| 2004/08/12 11:25:38 | 1 |
| 2004/08/12 11:25:39 | 1 |
| 2004/08/12 11:25:40 | 1 |
| 2004/08/12 11:25:41 | 0 |
| 2004/08/12 11:25:42 | 1 |
| 2004/08/12 11:25:43 | 1 |
| 2004/08/12 11:25:44 | 1 |
| 2004/08/12 11:25:45 | 0 |
| 2004/08/12 11:25:46 | 0 |
| 2004/08/12 11:25:47 | 0 |
| 2004/08/12 11:25:48 | 0 |
| 2004/08/12 11:25:49 | 0 |

Fig.10

| TIME | | OUTPUT |
|---|---|---|
| 2004/08/12 | 11:25:34 | 0 |
| 2004/08/12 | 11:25:35 | 0 |
| 2004/08/12 | 11:25:36 | 0 |
| 2004/08/12 | 11:25:37 | 0 |
| 2004/08/12 | 11:25:38 | 0 |
| 2004/08/12 | 11:25:39 | 0 |
| 2004/08/12 | 11:25:40 | 0 |
| 2004/08/12 | 11:25:41 | 1 |
| 2004/08/12 | 11:25:42 | 1 |
| 2004/08/12 | 11:25:43 | 1 |
| 2004/08/12 | 11:25:44 | 1 |
| 2004/08/12 | 11:25:45 | 1 |
| 2004/08/12 | 11:25:46 | 1 |
| 2004/08/12 | 11:25:47 | 1 |
| 2004/08/12 | 11:25:48 | 1 |
| 2004/08/12 | 11:25:49 | 1 |

Fig.11

| TIME | | OUTPUT | |
|---|---|---|---|
| 2004/08/12 | 11:25:34 | 1 | PASS |
| 2004/08/12 | 11:25:35 | 1 | |
| 2004/08/12 | 11:25:36 | 1 | |
| 2004/08/12 | 11:25:37 | 1 | |
| 2004/08/12 | 11:25:38 | 1 | |
| 2004/08/12 | 11:25:39 | 1 | |
| 2004/08/12 | 11:25:40 | 1 | |
| 2004/08/12 | 11:25:41 | 1 | PASS |
| 2004/08/12 | 11:25:42 | 1 | STOP |
| 2004/08/12 | 11:25:43 | 1 | |
| 2004/08/12 | 11:25:44 | 1 | |
| 2004/08/12 | 11:25:45 | 1 | |
| 2004/08/12 | 11:25:46 | 1 | |
| 2004/08/12 | 11:25:47 | 1 | |
| 2004/08/12 | 11:25:48 | 1 | |
| 2004/08/12 | 11:25:49 | 1 | STOP |

| TIME | | OUTPUT | |
|---|---|---|---|
| 2004/08/12 | 11:25:34 | | PASS |
| 2004/08/12 | 11:25:35 | 1 | |
| 2004/08/12 | 11:25:36 | 1 | |
| 2004/08/12 | 11:25:37 | 1 | |
| 2004/08/12 | 11:25:38 | 1 | |
| 2004/08/12 | 11:25:39 | 1 | |
| 2004/08/12 | 11:25:40 | 1 | |
| 2004/08/12 | 11:25:41 | 1 | |
| 2004/08/12 | 11:25:42 | 1 | |
| 2004/08/12 | 11:25:43 | 1 | |
| 2004/08/12 | 11:25:44 | 1 | PASS |
| 2004/08/12 | 11:25:45 | 0 | STOP |
| 2004/08/12 | 11:25:46 | 0 | |
| 2004/08/12 | 11:25:47 | 0 | |
| 2004/08/12 | 11:25:48 | 0 | |
| TIME | | OUTPUT | STOP |

Fig.14

| TIME | |
|---|---|
| 2004/08/12 11:25:34 | OPERATION |
| 2004/08/12 11:25:35 | |
| 2004/08/12 11:25:36 | |
| 2004/08/12 11:25:37 | |
| 2004/08/12 11:25:38 | |
| 2004/08/12 11:25:39 | |
| 2004/08/12 11:25:40 | |
| 2004/08/12 11:25:41 | OPERATION |
| 2004/08/12 11:25:42 | TROUBLE STOP |
| 2004/08/12 11:25:43 | |
| 2004/08/12 11:25:44 | |
| 2004/08/12 11:25:45 | |
| 2004/08/12 11:25:46 | |
| 2004/08/12 11:25:47 | |
| 2004/08/12 11:25:48 | |
| 2004/08/12 11:25:49 | TROUBLE STOP |

Fig.15

| TIME | |
|---|---|
| 2004/08/12 11:25:34 | OPERATION |
| 2004/08/12 11:25:35 | |
| 2004/08/12 11:25:36 | |
| 2004/08/12 11:25:37 | |
| 2004/08/12 11:25:38 | |
| 2004/08/12 11:25:39 | |
| 2004/08/12 11:25:40 | |
| 2004/08/12 11:25:41 | OPERATION |
| 2004/08/12 11:25:42 | CARRYING-OUT IDLE |
| 2004/08/12 11:25:43 | |
| 2004/08/12 11:25:44 | |
| 2004/08/12 11:25:45 | |
| 2004/08/12 11:25:46 | |
| 2004/08/12 11:25:47 | |
| 2004/08/12 11:25:48 | |
| 2004/08/12 11:25:49 | CARRYING-OUT IDLE |

Fig.17

| TIME | |
|---|---|
| 2004/08/12 11:25:34 | |
| 2004/08/12 11:25:35 | OPERATION |
| 2004/08/12 11:25:36 | |
| 2004/08/12 11:25:37 | |
| 2004/08/12 11:25:38 | |
| 2004/08/12 11:25:39 | |
| 2004/08/12 11:25:40 | |
| 2004/08/12 11:25:41 | OPERATION |
| 2004/08/12 11:25:42 | FORCED STOP |
| 2004/08/12 11:25:43 | |
| 2004/08/12 11:25:44 | |
| 2004/08/12 11:25:45 | |
| 2004/08/12 11:25:46 | |
| 2004/08/12 11:25:47 | |
| 2004/08/12 11:25:48 | |
| 2004/08/12 11:25:49 | FORCED STOP |

| TIME | — |

Fig.18

EMPLOYEE CODE: 010020008

PASSWORD: ********

OK    CANCEL

INFORMATION PROCESSING DEVICE, OPERATION STATE MANAGEMENT DEVICE, INFORMATION PROCESSING METHOD, PROGRAM, AND COMPUTER-READABLE STORAGE MEDIUM STORING PROGRAM

BACKGROUND OF THE INVENTION

1. Field of the Invention

This invention relates to an information processing device, an operation state management device, an information processing method, a program, and a computer-readable storage medium which stores a program, for analyzing the operation state of production facilities on a production line.

2. Description of the Related Art

Conventionally, it is known an operation state management device which receives input of a cause of stop of production facilities and repair informations to deal with the stop and then manages these inputs in time series.

Patent Reference 1 and 2 disclose devices equivalent to the above-described operation state management device.

Specifically, Patent Reference 1 discloses a device having a receiving unit that receives stop data including trouble data of production facilities and an input unit that inputs the details of trouble, wherein the stop data and repair informations are displayed together in time series when it is judged that the production facilities stopped because of a trouble.

Patent Reference 2 discloses a device having a Gantt chart preparation unit that prepares a Gantt chart representing the relation between plural causes of stop of facilities and the time when the stop occurred, and a display unit that outputs (displays) the prepared Gantt chart.

Patent Reference 1: JP-A-2001-67123 (laid open on Mar. 16, 2001)

Patent Reference 2: JP-A-2000-123085 (laid open on Apr. 28, 2000)

If a certain production facility on a production line stops operation, this stop may cause the other production facilities to stop operation. In short, the production facilities stop operation like a chain reaction.

However, the devices disclosed in Patent Reference 1 and 2 can only display the operation state of one production facility in time series, when analyzing the operation of the production facility by using at least inputted information about a cause of stop.

Therefore, with these devices, it is difficult for a user to visually judge how the stops of the operations of the production facilities are interlocked. When the user attempts to grasp the chained stops of operation as described above, the user must switch the display screen each time.

Therefore, with the above-described devices, it takes time and labor to analyze the operation state of the production facilities.

SUMMARY OF THE INVENTION

In view of the foregoing problems, it is an object of this invention to realize an information processing device, an operation state management device, an information processing method, a program, and a computer-readable storage medium which stores a program that enable analysis of the operation state of production facilities.

In order to solve the foregoing problems, an information processing device according to this invention includes: an operation state acquisition unit that sequentially acquires operation information indicating operation of a production facility on a production line and stop information indicating stop of the facility, for each production facility; a stop cause receiving unit that receives input of stop cause information indicating a cause of stop of the production facility, for each production facility; an association unit that associates the stop cause information at least with the stop information and stores the operation information and the associated information into a storage unit; and a display control unit that displays both the stored operation information and the associated information with respect to plural production facilities in time series on a display screen.

In this structure, the operation state acquisition unit sequentially acquires operation information indicating operation of a production facility on a production line and stop information indicating stop of the facility, for each production facility. The stop cause receiving unit receives input of stop cause information indicating a cause of stop of the production facility. The association unit associates the stop cause information at least with the stop information and stores the operation information and the associated information into the storage unit.

Thus, the operation information, the stop information, and the stop cause information associated with the stop information are sequentially stored into the storage unit for each production facility.

The display control unit displays both the stored operation information and the associated information with respect to plural production facilities in time series on the display screen. Therefore, when analyzing the operation state of the production facility by using the stop cause information, a display related to the operation states of the plural production facilities can be made in time series.

This makes it possible to judge how the stops of operation of the production facilities on the production line are interlocked.

Therefore, an information processing device that facilitates the analysis of the operation state of the production facility can be provided.

The information processing device according to this invention may also have a repair information receiving unit that receives input of repair information indicating repair informations to deal with the stop, for each production facility, and the association unit further associates the repair information.

In this structure, the repair information receiving unit receives input of repair information indicating repair informations to deal with the stop, for each production facility.

Moreover, the association unit associates the repair information. Thus, the stop cause information and the repair information are associated with the stop information.

Therefore, the display control unit can also display the repair informations in time series on the display screen.

The information processing device according to this invention may also have a video information acquisition unit that acquires video information indicating a video of the area around the production facility and of a time corresponding to each of the stop information, from outside for each production facility. The association unit further associates the video information. If a predetermined instruction is received when receiving input of the stop cause information associated with the stop information, the display control unit displays a video indicated by video information corresponding the stop information.

In this structure, the video information acquisition unit can acquire video information indicating a video of the area around the production facility and of a time corresponding to each stop information, from outside for each production facility.

The association unit associates the video information. Thus, the stop cause information, the repair information and the video information are associated with the stop information.

Moreover, if a predetermined instruction is received when receiving input of the stop cause information associated with the stop information, the display control unit displays a video indicated by video information corresponding to the stop information.

Thus, an operator working at a production facility can watch a video indicated by video information corresponding to stop information by inputting a predetermined instruction to the information processing device when inputting stop cause information.

Therefore, even in the case of inputting stop cause information after finishing his/her operation, the operator can input accurate stop cause information by watching the video.

In the information processing device according to this invention, the operation state acquisition unit may acquire classification information indicating one of forced stop, trouble, carrying-in idle and carrying-out idle, as the stop information, wherein the forced stop is the stop of the facility based on an instruction from outside, the trouble is the stop based on malfunction of the facility, the carrying-in idle is the stop based on standby state for carrying-in of a work, and the carrying-out idle is the stop based on standby state for carrying-out of a work. When the stop cause receiving unit receives stop cause information, the display control unit may display an input area for stop cause information in association with a display area indicating each stop state on the display screen generated on the basis of each stop information, and displays identification information corresponding to the classification information in association with the display area.

In this structure, the operation state acquisition unit can acquire classification information indicating one of forced stop, trouble, carrying-in idle and carrying-out idle, as the stop information.

Also, when the stop cause receiving unit receives stop cause information, the display control unit displays an input area for stop cause information in association with a display area indicating each stop state on the display screen generated on the basis of each stop information, and displays identification information corresponding to the classification information in association with the display area.

Thus, when inputting stop cause information, the operator can refer to identification information corresponding to classification information. The operator can thus identify each stop as forced stop, trouble, carrying-in idle or carrying-out idle on the display screen.

Therefore, even in the case of inputting stop cause information after finishing his/her operation, the operator can input accurate stop cause information.

In the information processing device according to this invention, the operation state acquisition unit may acquire classification information indicating one of forced stop, trouble, carrying-in idle and carrying-out idle, as the stop information, wherein the forced stop is the stop of the facility based on an instruction from outside, the trouble is the stop based on malfunction of the facility, the carrying-in idle is the stop based on standby state for carrying-in of a work, and the carrying-out idle is the stop based on standby state for carrying-out of a work. The stop cause receiving unit may receive input of the classification information as the stop cause information. When receiving the stop cause information, the display control unit may display an input area for stop cause information in association with each display area indicating a stop state on the display screen generated on the basis of each stop information, and displays information corresponding to the classification information in the input area.

In this structure, the operation state acquisition unit can acquire classification information indicating one of forced stop, trouble, carrying-in idle and carrying-out idle, as the stop information.

Also, the stop cause receiving unit receives input of the classification information as the stop cause information.

Moreover, when receiving the stop cause information, the display control unit displays an input area for stop cause information in association with each display area indicating a stop state on the display screen generated on the basis of each stop information, and displays information corresponding to the classification information in the input area.

In short, information corresponding to classification information is automatically inputted as stop cause information without being inputted by the operator.

Therefore, the time and labor for inputting by the operator can be saved and accurate stop cause information can be inputted.

In the information processing device according to this invention, when the operation state acquisition unit receives the classification information indicating forced stop or trouble with respect to an n-th production facility from upstream of the production line and receives the classification information indicating carrying-in idle with respect to an (n+1)-th production facility from upstream, the association unit further associates the classification information indicating the forced stop or trouble with the classification information indicating carrying-in idle, and the display control unit displays an object representing the association of the classification information indicating the forced stop or trouble with the classification information indicating carrying-in idle on the display screen.

In this structure, when the operation state acquisition unit receives the classification information indicating forced stop or trouble with respect to the n-th production facility and receives the classification information indicating carrying-in idle with respect to the (n+1)-th production facility, the association unit further associates the classification information indicating the forced stop or trouble with the classification information indicating carrying-in idle.

Also, the display control unit displays an object representing the association of the classification information indicating the forced stop or trouble with the classification information indicating carrying-in idle on the display screen.

Thus, in the case where the operator inputs stop cause information, the operator can grasp more clearly the relation between a production facility that stopped on the basis of an instruction from outside or a production facility that stopped because of its own malfunction and a production facility downstream by one that stopped because of the influence of the stop, on the display screen. Also, in the case where a manager of the production line analyzes the operation state of the production facilities, the manager can grasp more clearly the relation between the production facility that stopped on the basis of an instruction from outside or the production facility that stopped because of its own malfunction and the production facility downstream by one that stopped because of the influence of the stop, on the display screen.

Therefore, in any case, it is possible to grasp more clearly the relation between the production facility that stopped on the basis of an instruction from outside or the production that stopped because of its own malfunction and the production facility downstream by one that stopped because of the influence of the stop.

In the information processing device according to this invention, the operation state acquisition unit may also receive classification information indicating carrying-in idle with respect to a production facility that is arranged downstream from the (n+1)-th production facility and arranged continuously from the (n+1)-th production facility.

In this structure, the operation state acquisition unit can receive the classification information indicating carrying-in idle with respect to a production facility that is arranged downstream from the (n+1)-th production facility and arranged continuously from the (n+1)-th production facility.

Therefore, it is possible to grasp more clearly the relation between the production facility that stopped on the basis of an instruction from outside or the production facility that stopped because of its own malfunction and the plural downstream production facilities that stopped because of the influence of the stop.

In the information processing device according to this invention, when the operation state acquisition unit receives the classification information indicating forced stop or trouble with respect to an n-th production facility from upstream of the production line and receives the classification information indicating carrying-out idle with respect to an (n−1)-th production facility from upstream, the association unit further associates the classification information indicating the forced stop or trouble with the classification information indicating carrying-out idle, and the display control unit displays an object representing the association of the classification information indicating the forced stop or trouble with the classification information indicating carrying-out idle on the display screen.

In this structure, when the operation state acquisition unit receives the classification information indicating forced stop or trouble with respect to the n-th production facility and receives the classification information indicating carrying-out idle with respect to the (n−1)-th production facility, the association unit further associates the classification information indicating the forced stop or trouble with the classification information indicating carrying-out idle.

Thus, in the case where the operator inputs stop cause information, the operator can grasp more clearly the relation between a production facility that stopped on the basis of an instruction from outside or a production facility that stopped because of its own malfunction and a production facility upstream by one that stopped because of the influence of the stop, on the display screen. Also, in the case where a manager of the production line analyzes the operation state of the production facilities, the manager can grasp more clearly the relation between the production facility that stopped on the basis of an instruction from outside or the production facility that stopped because of its own malfunction and the production facility upstream by one that stopped because of the influence of the stop, on the display screen.

Therefore, in any case, it is possible to grasp more clearly the relation between the production facility that stopped on the basis of an instruction from outside or the production facility that stopped because of its own malfunction and the production facility upstream by one that stopped because of the influence of the stop.

In the information processing device according to this invention, the operation state acquisition unit may also receive classification information indicating carrying-out idle with respect to a production facility that is arranged upstream from the (n−1)-th production facility and arranged continuously from the (n−1)-th production facility.

In this structure, the operation state acquisition unit can receive the classification information indicating carrying-out idle with respect to a production facility that is arranged upstream from the (n−1)-th production facility and arranged continuously from the (n−1)-th production facility.

Therefore, it is possible to grasp more clearly the relation between the production facility that stopped on the basis of an instruction from outside or the production facility that stopped because of its own malfunction and the plural upstream production facilities that stopped because of the influence of the stop.

In the information processing device according to this invention, one or more pieces of stop cause information are stored in the storage unit for each of the classification information, and if a predetermined instruction is received when receiving input of stop cause information associated with the stop information, the display control unit displays a list of the stored pieces of stop cause information so that any of them can be selected.

In this structure, one or more pieces of stop cause information are stored in the storage unit for each classification information.

Also, if a predetermined instruction is received when receiving input of stop cause information associated with the stop information, the display control unit displays a list of the stored pieces of stop cause information so that any of them can be selected.

Therefore, the operator can easily input stop cause information by inputting the predetermined instruction.

The information processing device according to this invention may also have a registration unit that registers stop cause information to the storage unit.

In this structure, the registration unit can register stop cause information to the storage unit.

Therefore, the operator or manager can add new stop cause information.

The information processing device according to this invention may also have a totaling unit that totals the number of times the selected stop cause information is selected, for each production facility, and the display control unit displays the stop cause information in order from the stop cause information that is selected the largest number of times, on the display screen when displaying a list.

In this structure, the totaling unit totals the number of times the selected stop cause information is selected, for each production facility.

Also, the display control unit displays the stop cause information in order from the stop cause information that is selected the largest number of times, on the display screen when displaying a list. In short, the stop cause information is displayed in order from the stop cause information selected most frequently by the operator.

Therefore, the operator can select stop cause information more quickly than in the case where the stop cause information is not arranged in order from the stop cause information that is selected the largest number of times.

In the information processing device according to this invention, information indicating one or more pieces of repair information are stored in the storage unit for each of the classification information, and if a predetermined instruction is received when receiving input of repair information associated with the stop information, the display control unit displays a list of the stored pieces of repair information so that any of them can be selected.

In this structure, one or more pieces of repair information are stored in the storage unit for each classification information.

Also, if a predetermined instruction is received when receiving input of repair information associated with the stop information, the display control unit displays a list of the stored pieces of repair information so that any of them can be selected.

Therefore, the operator can easily input repair information by inputting the predetermined instruction.

The information processing device according to this invention may also have a registration unit that registers repair information to the storage unit.

In this structure, the registration unit can register repair information to the storage unit.

Therefore, the operator or manager can add new repair information.

The information processing device according to this invention may also have a totaling unit that totals the number of times the selected repair information is selected, for each production facility, and the display control unit displays the repair information in order from the repair information that is selected the largest number of times, on the display screen when displaying a list.

In this structure, the totaling unit totals the number of times the selected repair information is selected, for each production facility.

Also, the display control unit displays the repair information in order from the repair information that is selected the largest number of times, on the display screen when displaying a list. In short, the repair information is displayed in order from the repair information selected most frequently by the operator.

Therefore, the operator can select repair information more quickly than in the case where the repair information is not arranged in order from the repair information that is selected the largest number of times.

The information processing device according to this invention may also have a judgment unit that judges whether input of the stop cause information associated with all the stop information is completed or not, and if it is judged that the input is not completed, the display control unit displays a predetermined warning on the display screen.

In this structure, the judgment unit judges whether input of the stop cause information associated with all the stop information is completed or not.

If it is judged that the input is not completed, the display control unit displays a predetermined warning on the display screen.

Therefore, failure to input the stop cause information by the operator can be prevented.

The information processing device according to this invention may also have a judgment unit that judges whether input of the stop cause information associated with all the stop information is completed or not, and a warning sound generating unit that generates a warning sound if it is judged that the input is not completed.

In this structure, the judgment unit judges whether input of the stop cause information associated with all the stop information is completed or not.

If it is judged that the input is not completed, the warning sound generating unit generates a warning sound.

Therefore, failure to input the stop cause information by the operator can be prevented.

The information processing device according to this invention may also have an identification information receiving unit that receives input of identification information identifying operators, and a charge information acquisition unit that acquires information indicating a production facility on the basis of the received identification information from a server unit that associates and stores the identification information identifying each operator with information indicating a production facility of which each operator is in charge. The display control unit displays both the stored operation information and the associated information with respect to the production facility indicated by the acquired information, in time series on the display screen.

In this structure, the identification information receiving unit receives input of identification information identifying operators.

Also, the charge information acquisition unit acquires information indicating a production facility on the basis of the received identification information from the server unit that associates and stores the identification information identifying each operator with information indicating a production facility of which each operator is in charge.

Moreover, the display control unit displays both the stored operation information and the associated information with respect to the production facility indicated by the acquired information, in time series on the display screen. In short, both the stored operation information and the associated information are displayed in time series on the display screen, with respect to the production facility of which the operator specified by the identification information is in charge.

Therefore, when this operator inputs at least stop cause information, the operation information of the other production facilities than the production facility of which the operator is in charge and the associated information are not displayed on the display screen.

This enables the operator to quickly input information.

In the information processing device according to this invention, charge time information indicating charge time when each operator is in charge of a production facility is further stored in the storage unit. The charge information acquisition unit further acquires the charge time information on the basis of the received identification information, and the display control unit displays both the stored operation information and the associated information with respect to a specified charge time, in time series on the display screen.

In this structure, charge time information indicating charge time when each operator is in charge of a production facility is further stored in the server unit, and the charge information acquisition unit acquires the charge time information on the basis of the received identification information.

Also, the display control unit displays both the stored operation information and the associated information with respect to a specified charge time, in time series on the display screen.

Therefore, when this operator inputs at least stop cause information, the operation information of the other times than the time when the operator is in charge of the production facility and the associated information are not displayed on the display screen.

This enables the operator to quickly input information.

In order to solve the foregoing problems, an operation state management device includes the above-described information processing device, and a classification information generation device that generates the classification information on the basis of the operation information and the stop information and sends the generated classification information to the information processing device.

In this structure, the classification information generation device generates the classification information on the basis of the operation information and the stop information and sends the generated classification information to the information processing device. Therefore, the information processing device can receive the classification information.

Thus, it is possible to provide an operation state management device can generate classification information and can display identification information corresponding to the classification information in association with the display area by using the classification information or can display information corresponding to the classification information in the input area.

In order to solve the foregoing problems, an information processing method according to this invention includes: an operation state acquisition step of sequentially acquiring operation information indicating operation of a production facility on a production line and stop information indicating stop of the facility, for each production facility; a stop cause receiving step of receiving input of stop cause information indicating a cause of stop of the production facility, for each production facility; an association step of associating the stop cause information at least with the stop information and storing the operation information and the associated information into a storage unit; and a display step of displaying both the stored operation information and the associated information with respect to plural production facilities in time series on a display screen.

In this method, at the operation state acquisition step, operation information indicating operation of a production facility on a production line and stop information indicating stop of the facility are sequentially acquired for each production facility. At the stop cause receiving step, input of stop cause information indicating a cause of stop of the production facility is received. At the association step, the stop cause information is associated at least with the stop information, and the operation information and the associated information are stored into the storage unit.

Thus, the operation information, the stop information, and the stop cause information associated with the stop information are sequentially stored into the storage unit for each production facility.

At the display step, both the stored operation information and the associated information with respect to plural production facilities are displayed in time series on the display screen. Therefore, when analyzing the operation state of the production facility by using the stop cause information, a display in time series related to the operation states of the plural production facilities can be made.

This makes it possible to judge how the stops of operation of the production facilities on the production line are interlocked.

Therefore, an information processing method that facilitates the analysis of the operation state of the production facility can be provided.

A program according to this invention is a program for causing a computer to function as each unit of the information processing device as described above.

Therefore, by loading the program to a computer system, it is possible to provide the information processing device to the user.

A storage medium according to this invention is a computer-readable storage medium in which the program is stored as described above.

Therefore, by loading the program stored in the storage medium to a computer system, it is possible to provide the information processing device to the user.

As described above, the information processing device according to this invention includes: an operation state acquisition unit that sequentially acquires operation information indicating operation of a production facility on a production line and stop information indicating stop of the facility, for each production facility; a stop cause receiving unit that receives input of stop cause information indicating a cause of stop of the production facility, for each production facility; an association unit that associates the stop cause information at least with the stop information and stores the operation information and the associated information into a storage unit; and a display control unit that displays both the stored operation information and the associated information with respect to plural production facilities in time series on a display screen.

Therefore, an information processing device that facilitates the analysis of the operation state of the production facility can be provided.

As described above, the operation state management device includes the above-described information processing device, and a classification information generation device that generates the classification information on the basis of the operation information and the stop information and sends the generated classification information to the information processing device.

Therefore, it is possible to provide an operation state management device that can generate classification information and can display identification information corresponding to the classification information in association with the display area by using the classification information or can display information corresponding to the classification information in the input area.

As described above, the information processing method according to this invention includes: an operation state acquisition step of sequentially acquiring operation information indicating operation of a production facility on a production line and stop information indicating stop of the facility, for each production facility; a stop cause receiving step of receiving input of stop cause information indicating a cause of stop of the production facility, for each production facility; an association step of associating the stop cause information at least with the stop information and storing the operation information and the associated information into a storage unit; and a display step of displaying both the stored operation information and the associated information with respect to plural production facilities in time series on a display screen.

Therefore, an information processing method that facilitates the analysis of the operation state of the production facility can be provided.

As described above, the program according to this invention is a program for causing a computer to function as each unit of the information processing device.

Therefore, by loading the program to a computer system, it is possible to provide the information processing device to the user.

As described above, the storage medium according to this invention is a computer-readable storage medium in which the program is stored.

Therefore, by loading the program stored in the storage medium to a computer system, it is possible to provide the information processing device to the user.

BRIEF DESCRIPTION OF THE DRAWINGS

FIG. 3 shows first correspondence information at a certain time in the case where a work exists at a predetermined position on the line.

FIG. 4 shows first correspondence information at a certain time in the case where a work does not exist at a predetermined position on the line.

FIG. 5 shows fourth correspondence information at a certain time in the case where a production facility is stopped.

FIG. 6 shows fourth correspondence information at a certain time in the case where a production facility is not stopped.

FIG. 8 shows a first correspondence information group.

FIG. 9 shows a second correspondence information group.

FIG. 10 shows a fourth correspondence information group.

FIG. 11 shows a first correspondence information group with flags.

FIG. 14 shows a fourth correspondence information group including information of operation or trouble stop added to the fourth correspondence information.

FIG. 15 shows a fourth correspondence information group including information of operation or carrying-out idle added to the fourth correspondence information.

FIG. 17 shows a fourth correspondence information group including information of operation or stop by an operator added to the fourth correspondence information.

FIG. 18 shows a log-in screen displayed on a display screen of a display unit.

DETAILED DESCRIPTION OF THE PREFERRED EMBODIMENTS

Hereinafter, an embodiment of this invention will be described with reference to FIGS. 1 to 26.

Figure 2:
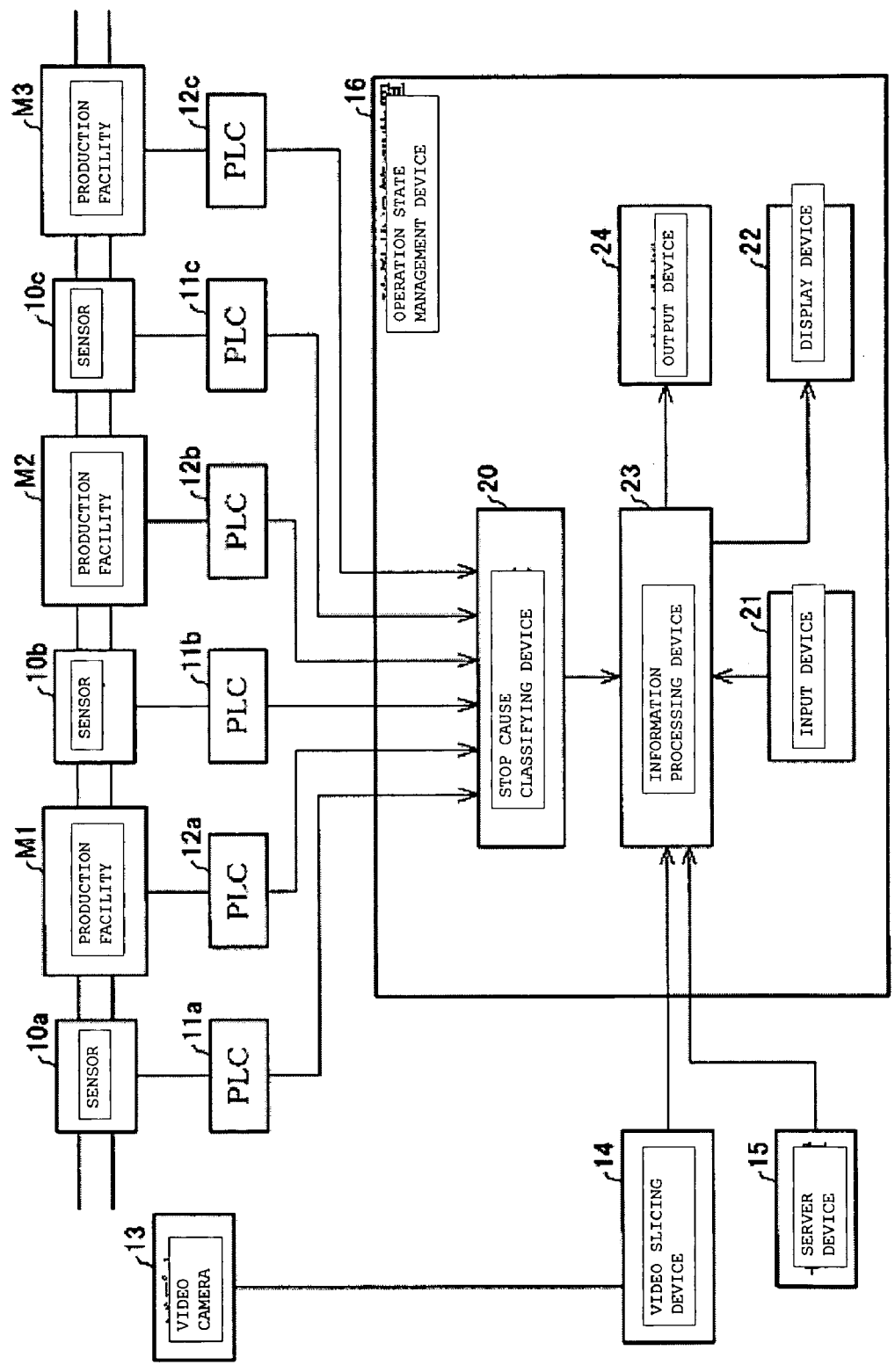
FIG. 2 shows a schematic structure of a production line management system.

FIG. 2 shows a schematic structure of production line management system according to this embodiment. As shown in FIG. 2, a production line management system 1 has sensors 10a to 10c, programmable logic controllers (PLCs) 11a to 11c, PLCs 12a to 12c, an operation state management device 16, a video camera 13, a video slicing device 14, and a server device 15. The operation state management device 16 has a stop cause classifying device (classification information generation device) 20, an input device 21, an information processing device 23, a display device 22, and an output device 24, as shown in FIG. 2.

The sensors (10a to 10c) perform sampling in the same cycle and at the same time.

It is now assumed that he production line managed by the production line management system 1 includes plural production facilities (in FIG. 2, only some production facilities (M1, M2, M3) are shown). In this embodiment, one operator is in charge of plural production facilities.

Each production facility has a stop button to stop its own operation. Each production facility (M1, M2, M3) outputs a signal indicating whether the stop button is pressed (that is, in the stop state) or not, to each PLC (12a, 12b, 12c). In short, each production facility outputs a signal indicating whether its own operation is stopped or not. This signal is outputted synchronously with the output from each sensor (10a to 10c). In short, the signal is outputted in the same cycle and at the same time as the output of each sensor.

The sensor 10a is arranged between the production facility M1 and a production facility (not shown) that is upstream by one from the production facility M1. The sensor 10a detects whether a work exists at a predetermined position on the production line or not, in a predetermined cycle (sampling cycle). The sensor 10a sequentially outputs a signal indicating the existence/non-existence of a work to the PLC 11a.

The PLC 11a sequentially receives the output from the sensor 10a. The PLC 11a takes correspondence between the received output and date and time information indicating date and time. The PLC 11a sequentially sends the corresponding information (hereinafter referred to as first correspondence information) to the stop cause classifying device 20 in the operation state management device 16. If a signal indicating the existence of a work is received, the PLC 11a sends first correspondence information, for example, as shown in FIG. 3, to the stop cause classifying device 20. On the other hand, if a signal indicating the non-existence of a work is received, the PLC 11a sends first correspondence information, for example as shown in FIG. 4, to the stop cause classifying device 20.

In FIG. 3, data of "output 1" indicating the existence of a work is caused to correspond to the date and time information. In FIG. 4, data of "output 0" indicating the non-existence of a work is caused to correspond to the date and time information.

The sensor 10b is arranged between the production facility M1 and the production facility M2. The sensor 10b detects whether a work exists at a predetermined position on the production line or not, in a predetermined cycle. The sensor 10b sequentially outputs a signal indicating the existence/non-existence of a work to the PLC 11b.

The PLC 11b sequentially receives the output from the sensor 10b. The PLC 11b takes correspondence between the received output and date and time information indicating date and time. The PLC 11b sequentially sends the corresponding information (hereinafter referred to as second correspondence information) to the stop cause classifying device 20 in the operation state management device 16. The second correspondence information sent by the PLC 11b is information of the same format as the first correspondence information sent by the PLC 11a.

The sensor 10c is arranged between the production facility M2 and a production facility (not shown) that is downstream by one from the production facility M2. The sensor 10c detects whether a work exists at a predetermined position on the production line or not, in a predetermined cycle. The sensor 10c sequentially outputs a signal indicating the existence/non-existence of a work to the PLC 11c.

The PLC 11c sequentially receives the output from the sensor 10c. The PLC 11c takes correspondence between the received output and date and time information indicating date and time. The PLC 11c sequentially sends the corresponding information (hereinafter referred to as third correspondence information) to the stop cause classifying device 20 in the operation state management device 16. The third correspondence information sent by the PLC 11c is information of the same format as the first and second correspondence information sent by the PLCs 11a and 11b.

The PLC 12a sequentially receives a signal indicating whether the operation of the production facility M1 is stopped or not, from the production facility M1. The PLC 12a takes correspondence between the received signal and date and time information indicating date and time. Then, the PLC 12a sends the corresponding information (hereinafter referred to as fourth correspondence information) to the stop cause classifying device 2b in the operation state management device 16. If a signal indicating that the operation is stopped is received, for example, fourth correspondence information as shown in FIG. 5 is sent. On the other hand, if a signal not indicating that the operation is stopped is received, for example, fourth correspondence information as shown in FIG. 6 is sent.

In FIG. 5, data of "output 1" indicating that the operation of the production facility is stopped is caused to correspond to the date and time information. In FIG. 6, data of "output 0" indicating that the operation of the production facility is not stopped is caused to correspond to the date and time information.

The PLC 12b sequentially receives a signal indicating whether the operation of the production facility M2 is stopped or not, from the production facility M2. The PLC 12b takes correspondence between the received signal and date and time information indicating date and time. Then, the PLC 12b sends the corresponding information (hereinafter referred to as fifth correspondence information) to the stop cause classifying device 20 in the operation state management device 16. The fifth correspondence information sent by the PLC 12b is information of the same format as the fourth correspondence information sent by the PLC 12a.

The PLC 12c sequentially receives a signal indicating whether the operation of the production facility M3 is stopped or not, from the production facility M3. The PLC 12c takes correspondence between the received signal and date and time information indicating date and time. Then, the PLC 12c sends the corresponding information (hereinafter referred to as sixth correspondence information) to the stop cause classifying device 20 in the operation state management device 16. The sixth correspondence information sent by the PLC 12c is information of the same format as the fourth and fifth correspondence information sent by the PLCs 12a and 12b.

The video camera 13 picks up a video (dynamic image) of the area around the production facilities on the production line. The video camera 13 takes correspondence between this video and date and time information indicating date and time. Then, the video camera 13 sends the video with the date and time information corresponding thereto, to the video slicing device 14.

The video slicing device 14 receives the video from the video camera. When a predetermined instruction is received from the operation state management device 16, the video slicing device 14 slices out a predetermined video part from the received video and sends the sliced-out video part to the operation state management device 16.

The server device 15 stores identification information identifying each operator, in association with information indicating the production facility of which each operator is in charge. The server device 15 also stores charge time information indicating charge time when each operator is in charge of the production facility, in association with the identification information of each operator.

Next, each unit (20 to 24) of the operation state management device 16 will be described.

Figure 7:
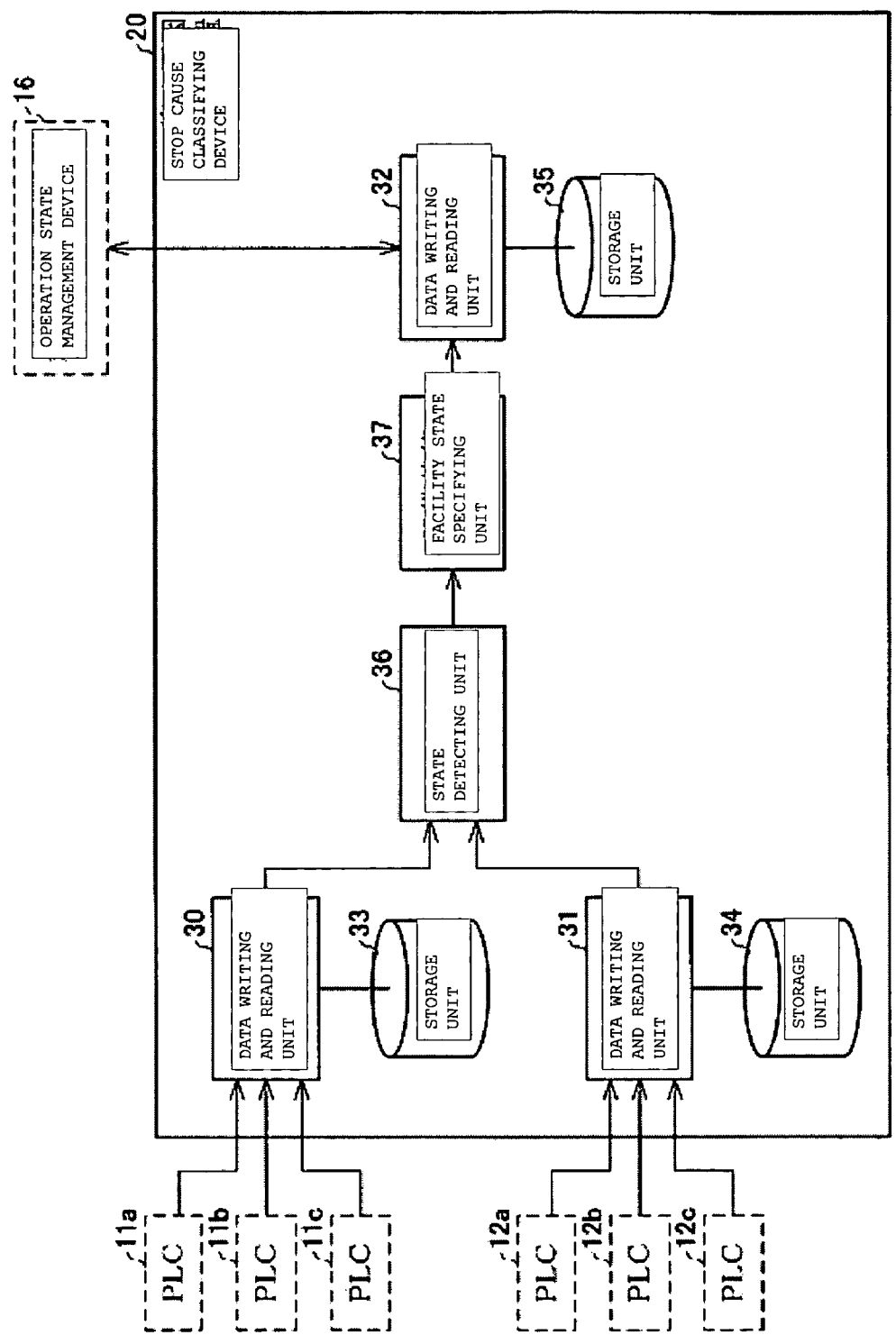
FIG. 7 shows a schematic structure of a stop cause classifying unit in the operation state management system.

First, the stop cause classifying device 20 will be described. FIG. 7 is a block diagram showing the structure of the stop cause classifying device 20. As shown in FIG. 7, the stop cause classifying device 20 has data writing and reading units (30 to 32), data storage units (33 to 35), a state detecting unit 36, and a facility state specifying unit 37.

The data writing and reading unit 30 receives the first to third correspondence information for each PLC from the PLCs (11a, 11b, 11c). The data writing and reading unit 30 sequentially writes the received correspondence information to the data storage unit 33.

FIG. 8 shows a series of first correspondence information (first correspondence information group) stored in the data storage unit 33. FIG. 9 shows a series of second correspondence information (second correspondence information group) stored in the data storage unit 33. FIGS. 8 and 9 show the case where the sampling cycle of the sensors 10a and 10b is one second. In consideration of the tact time of each production facility (processing time of one work), the sampling cycle must be at least equal to or less than the tact time of the production facility having the shortest tact time.

Also the third correspondence information is sequentially stored in the data storage unit 33. As a result, a series of third correspondence information (third correspondence information group) is stored in the data storage unit 33 in a format similar to the first and second corresponding information.

The data writing and reading unit 31 receives the fourth to sixth correspondence information for each PLC from the PLCs (12a, 12b, 12c). The data writing and reading unit 31 sequentially writes the received correspondence information to the data storage unit 34. FIG. 10 shows a series of fourth correspondence information stored in the data storage unit 34. Also the fifth and sixth correspondence information is stored in the data storage unit 34 in a format similar to the fourth correspondence information.

The state detecting unit 36 detects whether a work passed the position where each sensor (10a to 10c) is installed, at every output time of the signal from the sensors (10a to 10c). The state detecting unit 36 appends a flag corresponding to the result of detection to each correspondence information. Moreover, the state detecting unit 36 sends each series of correspondence information (each correspondence information group) with the flag appended thereto, to the facility state specifying unit 37.

Hereinafter, a specific technique for the above-described detection will be described, using an exemplary case where the state detecting unit 36 detects whether a work passed the position where the sensor 10a is installed, and then appends the flag.

First, the state detecting unit 36 acquires the series of first correspondence information, which is the data related to the sensor 10a, from the data storage unit 33 via the data writing and reading unit 30. After that, on the basis of each output during a predetermined period, the state detecting unit 36 judges whether the output is changed or not during the period. If the output is changed, a flag of "pass" is appended to the first correspondence information indicating the first time of the period. On the other hand, if the output is not changed, a flag of "stop" is appended to the first correspondence information indicating the first time. Hereinafter, this will be described with reference to FIGS. 8 and 11.

First, the state detecting unit 36 acquires the first correspondence information after 11:25' 34", as shown in FIG. 8. On the basis of each output (four outputs) during the period from 11:25' 34" to 11:25' 37", the state detecting unit 36 judges whether the output is changed during the period. In this case, since the output is changed during the period, a flag of "pass" is appended to the first correspondence information indicating 11:25' 34" (the first time of the period).

Next, the time of the period is shifted one second later, and it is judged whether the output is changed or not during this period (i.e., period from 11:25' 35" to 11:25' 38"). A flag corresponding to the result of the judgement is appended to the first correspondence information indicating 11:25' 35". In this case, a flag of "pass" is appended.

Subsequently, the time of the period is shifted one second later and the processing as described above is carried out. Here, the output is not changed, for example, during the period from 11:25' 42" to 11:25' 45", and therefore a flag of "stop" is appended to the first correspondence information indicating 11:25' 42".

With respect to the first correspondence information having a flag of "pass" appended thereto and having an output value of "0", the state detecting unit 36 changes the output value from "0" to "1". The reason for making such a change is that "output 0 pass" and "output 1 pass" need not be particularly discriminated from each other.

Figures 12, 13:
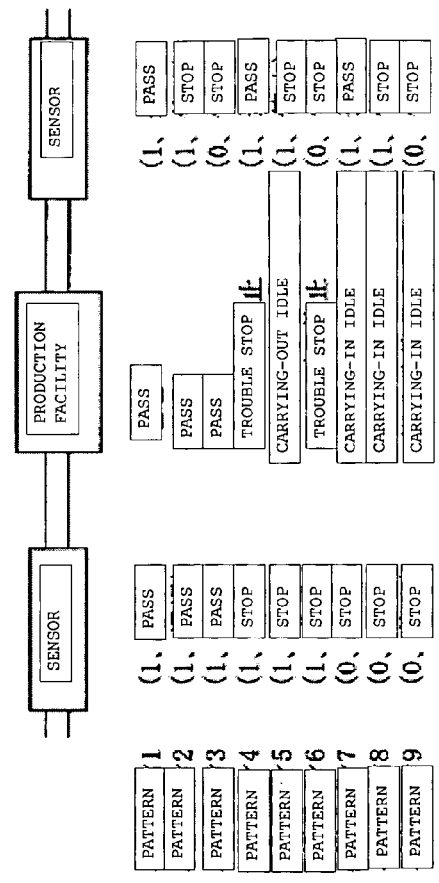
FIG. 12 shows a second correspondence information group with flags.
FIG. 13 shows the operation state of a production facility judged on the basis of a sensor output.

The above-described processing provides the first correspondence information group with the flags appended thereto, as shown in FIG. 11. By the similar processing, the second and third correspondence information groups with the flags appended thereto can be provided. FIG. 12 shows the second correspondence information group with the flags appended thereto.

In the above description, the period of 4 seconds is used (i.e., four data are used) when appending flags, but the period is not limited to this. However, considering that the line speed is decided by the production facility having a tact time of maximum value on the production line, it is preferred that the above-described period is set as the maximum value of the tact time.

The state detecting unit 36 also acquires each series of correspondence information (correspondence information group), which is the data related to each production facility (M1 to M3) from the data storage unit 34 via the data writing and reading unit 31. The state detecting unit 36 sends the correspondence information groups (fourth to sixth correspondence information groups) to the facility state specifying unit 37.

The facility state specifying unit 37 receives each series of correspondence information (each correspondence information group) with the flags appended thereto. Hereinafter, a correspondence information group with flags appended thereto is referred to as flag-appended information group (specifically, first flag-appended information group, second flag-appended information group, and third flag-appended information group), and each piece of information constituting the flag-appended information groups (that is, correspondence information with flag) is referred to as flag-appended information.

The facility state specifying unit 37 specifies the operation state of each production facility every second in accordance with a flag-appended information group generated on the basis of the output of the sensor installed between a production facility and a production facility that is upstream by one from the former production facility and a flag-appended information group generated on the basis of the output of the sensor installed between a production facility and a production facility that is downstream by one from the former production facility. The facility state specifying unit 37 stores information indicating the operation state of the production facility identified every second (specifically, operation information indicating operation of the production facility or stop information indicating stop of the facility) to the data storage unit 35 via the data writing and reading unit 32.

The technique of specifying the operation state of the production facility will be specifically described hereinafter. Here, an example of specifying the operation state of the production facility M1 is described. However, the same applies to the production facility M2 and the production facility M3.

The facility state specifying unit 37 deletes the information related to the "output" in each piece of correspondence information of the fourth correspondence information group and the information related to the "value" of the output, received from the state detecting unit 36, and adds new information to each piece of correspondence information. Specifically, if the value of the output is "1", new information of "forced stop" is added. The correspondence information with the information of "forced stop" added thereto (hereinafter referred to as operator stop (forced stop) information) is equivalent to the stop information indicating stop of the facility.

On the other hand, if the value of the output is "0", the following processing is performed. On the basis of the first flag-appended information with respect to a time and the second flag-appended information with respect to the time, the facility state specifying unit 37 adds the following new information to the fourth correspondence information with respect to the time.

First, if the facility state specifying unit 37 judges that the first flag-appended information includes information of "output 1 pass" and the second flag-appended information includes information of "output 1 pass", the facility state specifying unit 37 judges the production facility M1 is operation, as shown in FIG. 13 (corresponding to pattern 1 in FIG. 13). The facility state specifying unit 37 adds information of "operation" as new information, for example, as shown in FIG. 14. The correspondence information with the information of "operation" being added thereto is equivalent to the operation information indicating operation of the facility.

If the facility state specifying unit 37 judges that the first flag-appended information includes information of "output 1 pass" and the second flag-appended information includes information of "output 1 stop", the facility state specifying unit 37 judges the production facility M1 is operation, as shown in FIG. 13 (corresponding to pattern 2 in FIG. 13). The facility state specifying unit 37 adds information of "operation" as new information.

If the facility state specifying unit 37 judges that the first flag-appended information includes information of "output 1 pass" and the second flag-appended information includes information of "output 0 stop", the facility state specifying unit 37 judges the production facility M1 is operation, as shown in FIG. 13 (corresponding to pattern 3 in FIG. 13). The facility state specifying unit 37 adds information of "operation" as new information.

If the facility state specifying unit 37 judges that the first flag-appended information includes information of "output 1 stop" and the second flag-appended information includes information of "output 1 pass", the facility state specifying unit 37 judges the production facility M1 is stopped because of a trouble, as shown in FIG. 13 (corresponding to pattern 4 in FIG. 13). The facility state specifying unit 37 adds information of "trouble stop" as new information, for example, as shown in FIG. 14. The correspondence information with the information of "trouble stop" is added thereto (hereinafter referred to as trouble stop information) is equivalent to the stop information indicating stop of the facility.

If the facility state specifying unit 37 judges that the first flag-appended information includes information of "output 1 stop" and the second flag-appended information includes information of "output 1 stop", the facility state specifying unit 37 judges the production facility M1 is stopped because of its standby state for carrying-out of a work, as shown in FIG. 13 (corresponding to pattern 5 in FIG. 13). The facility state specifying unit 37 adds information of "carrying-out idle" as new information, for example, as shown in FIG. 15. The correspondence information with the information of "carrying-out idle" is added thereto (hereinafter referred to as carrying-out idle information) is equivalent to the stop information indicating stop of the facility.

If the facility state specifying unit 37 judges that the first flag-appended information includes information of "output 1 stop" and the second flag-appended information includes information of "output 0 stop", the facility state specifying unit 37 judges the production facility M1 is stopped because of a trouble, as shown in FIG. 13 (corresponding to pattern 6 in FIG. 13). The facility state specifying unit 37 adds information of "trouble stop" as new information.

If the facility state specifying unit 37 judges that the first flag-appended information includes information of "output 0 stop" and the second flag-appended information includes information of "output 1 pass", the facility state specifying unit 37 judges the production facility M1 is stopped because of its standby state for carrying-in of a work, as shown in FIG. 13 (corresponding to pattern 7 in FIG. 13). The facility state specifying unit 37 adds information of "carrying-in idle" as new information. The correspondence information with the information of "carrying-in idle" is added thereto (hereinafter referred to as carrying-in idle information) is equivalent to the stop information indicating stop of the facility.

If the facility state specifying unit 37 judges that the first flag-appended information includes information of "output 0 stop" and the second flag-appended information includes information of "output 1 stop", the facility state specifying unit 37 judges the production facility M1 is stopped because of its standby state for carrying-in of a work, as shown in FIG. 13 (corresponding to pattern 8 in FIG. 13). The facility state specifying unit 37 adds information of "carrying-in idle" as new information.

If the facility state specifying unit 37 judges that the first flag-appended information includes information of "output 0 stop" and the second flag-appended information includes information of "output 0 stop", the facility state specifying unit 37 judges the production facility M1 is stopped because of its standby state for carrying-in of a work, as shown in FIG. 13 (corresponding to pattern 9 in FIG. 13). The facility state specifying unit 37 adds information of "carrying-in idle" as new information.

The operator stop (forced stop) information, trouble stop (trouble) information, carrying-in idle information and carrying-out stop information are equivalent to classification information in the claims.

When a predetermined instruction from the information processing device 23 is further received, the data writing and reading unit 32 reads out the information (operation information and stop information) stored in the data storage unit 35 and sends this read-out information to the information processing device 23.

Figure 16:
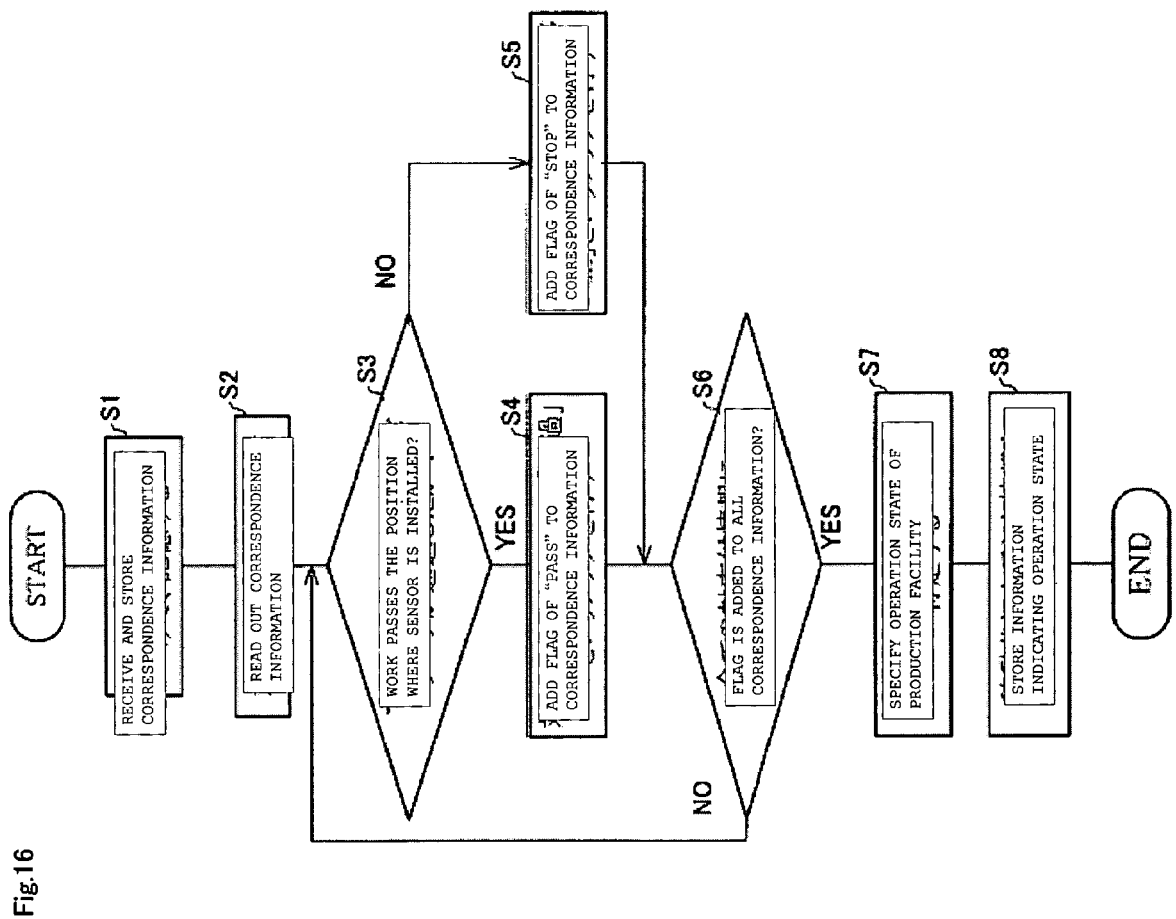
FIG. 16 is a flowchart showing a processing flow in the stop cause classifying unit.

Now, the processing flow in the stop cause classifying device 20 will be described with reference to FIG. 16.

First, the data writing and reading unit 30 and the data writing and reading unit 31 receive each correspondence information for each PLC from each PLC and sequentially write the received correspondence information to each data storage unit (33, 34) (S1) After S1, the state detecting unit 36 reads out the correspondence information from the data storage unit 33 (S2). After S2, the state detecting unit 36 detects whether a work passes the position where each sensor is installed, every second (S3).

If it is detected at S3 that a work passed at a certain time, the state detecting unit 36 adds a flag of "pass" to the correspondence information that is acquired via the PLCs 11a to 11c and that includes the date and time information of this time (S4). On the other hand, if it is not detected at S3 that a work passed at a certain time, the state detecting unit 36 adds a flag of "stop" to the correspondence information that is acquired via the PLCs 11a to 11c and that includes the date and time information of this time (S5).

After S4 and S5, the state detecting unit 36 judges whether a flag is added to all the correspondence information read out from the data storage unit 33 (S6).

If it is judged at step S6 that a flag is not added to all the correspondence information, the processing returns to S3. On the other hand, if it is judged at S6 that a flag is added to all the correspondence information, the facility state specifying unit 37 specifies the operation state of the production facility in accordance with the correspondence information with the flag appended thereto (flag-appended information) acquired on the basis of the output of the sensor that is upstream from the production facility, the correspondence information with the flag appended thereto acquired on the basis of the output of the sensor that is downstream from the production facility, and the output of the PLC (i.e., PLC 12a, PLC12b or PLC 12c) provided corresponding to the production facility (S7).

After S7, the facility state specifying unit 37 stores the information (operation information or stop information) indicating the operation state identified every second, to the data storage unit 35 via the data writing and reading unit 32 (S8). Then, the series of processing ends.

The input device 21 receives input of information made by an operator or production line manager. The input device 21 includes, for example, a keyboard, touch panel and the like. The information inputted by the operator includes stop cause information indicating a cause of stop of a production facility, repair information indicating repair informed taken in the production facility, identification information indicating identification information of the operator, indication information indicating displayed contents on the display device 22 and the like. The information inputted by the manager includes search information for performing data search and the like.

The display device receives information (drawing data which will be described later) sent from the information processing device 23. The display device 22 displays an image based on the received information on a display screen (not shown) of the display device 22.

Figure 1:
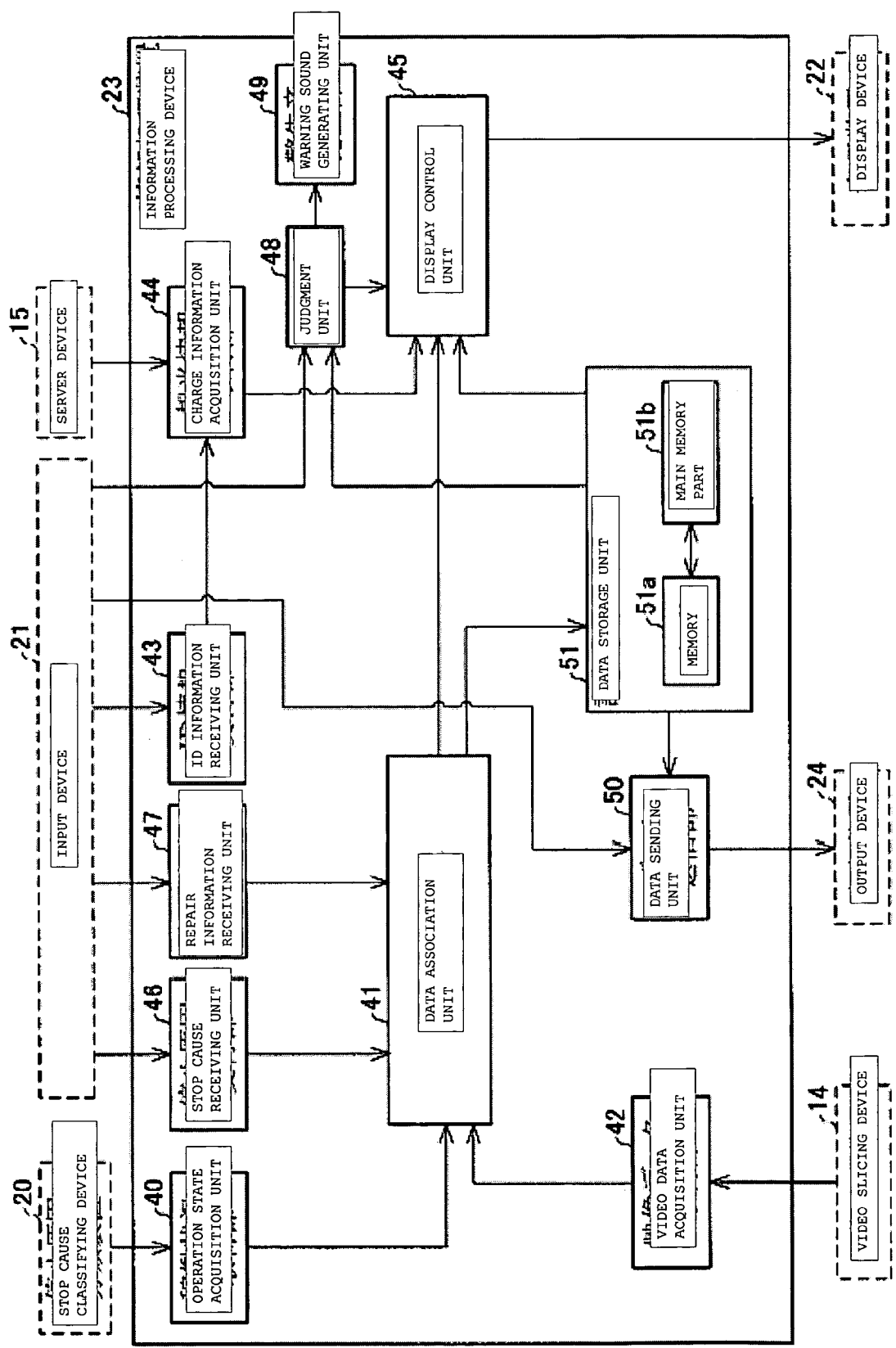
FIG. 1 shows a schematic structure of an information processing device in an operation state management device in a production line management system according to an embodiment of this invention.

The information processing device 23 will now be described. The information processing device 23 has an operation state acquisition unit 40, a data association unit (association unit) 41, a video data acquisition unit (video information acquisition unit) 42, an ID information receiving unit (identification information receiving unit) 43, a charge information acquisition unit 44, a display control unit 45, a stop cause receiving unit 46, repair information receiving unit 47, a judgment unit 48, a warning sound generating unit 49, a data sending unit 50, and a storage unit 51, as shown in FIG. 1. The storage unit 51 has a memory 51a and a main memory part 51b.

The operation state acquisition unit 40 sends the above-described predetermined instruction to the data writing and reading unit 32 of the stop cause classifying device 20. The operation state acquisition unit 40 receives the information indicating the operation state of the production facility every second (operation state information) stored in the data storage unit 35 of the stop cause classifying device 20. In short, the operation state acquisition unit 40 sequentially acquires the operation information indicating operation of the production facility and the stop information indicating stop of the facility (operator stop information, trouble stop information, carrying-in idle information, or carrying-out idle information), for example, as shown in FIGS. 14, 15 and 17, for each production facility. Moreover, the operation state acquisition unit 40 sends the acquired information to the data association unit 41.

The data association unit 41 receives the operation state information from the operation state acquisition unit 40, for each production facility. The data association unit 41 sends time information included in the stop information to the video data acquisition unit 42.

The video data acquisition unit 42 receives the time information from the data association unit 41. Then, the video data acquisition unit acquires video information of a predetermined time period including some periods before and after the time indicated by the time information, from the video slicing device 14. After that, the video data acquisition unit 42 sends the acquired video information to the data association unit 41.

The data association unit 41 associates each stop information with the video information of the time corresponding to the stop information and stores the associated information to the memory 51a. The memory 51a may be, for example, a non-volatile random access memory (RAM).

The ID information receiving unit 43 receives ID information identifying an operator, inputted via the input device 21. The ID information receiving unit 43 sends the ID information to the charge information acquisition unit 44.

The operation on the input device 21 for inputting the ID information is performed by an operator. In this case, for example, the display control unit 45 can prepare drawing data that causes a log-in screen to be displayed, as shown in FIG. 18, and display the log-in screen on the display screen of the display device 22. If an icon indicating "OK" on the log-in screen is selected, the ID information receiving unit 43 can send the ID information to the charge information acquisition unit 44.

The charge information acquisition unit 44 receives the ID information from the ID information receiving unit 43. Moreover, the charge information acquisition unit 44 acquires from the server device 15 information indicating the production facility of which the operator specified by the ID information is in charge, and charge time when the operator is in charge of the production facility, on the basis of the received identification information. The charge information acquisition unit 44 sends the information indicating the production facility and the charge time information, thus acquired, to the display control unit 45.

Figure 19:
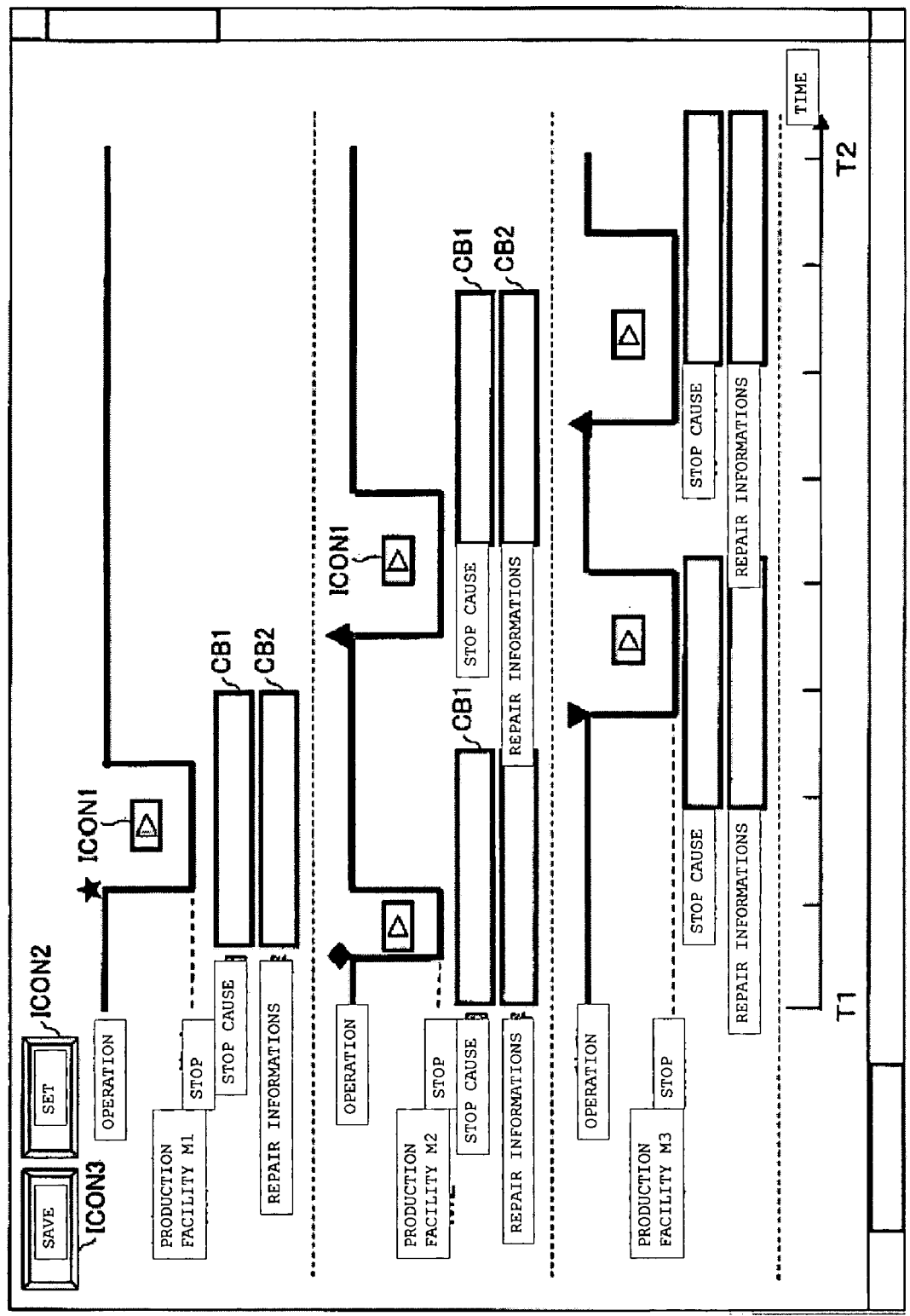
FIG. 19 shows an input screen displayed on the display screen of the display unit.

If a predetermined instruction related to data input by the operator is inputted to the display control unit 45 via the input device 21, the display control unit 45 reads out the associated information with respect to the production facility indicated by the information indicating the production facility and the time indicated by the charge time information, from the memory 51a. Then, the display control unit 45 prepares drawing data for data input based on the read-out information. Moreover, the display control unit 45 sends the prepared drawing data to the display device 22. In this case, a screen (input screen), for example, as shown in FIG. 19, is displayed as an input receiving screen on the display screen of the display device 22. FIG. 19 shows a display related to a partial time zone (time T1 to time T2) of the charge time is made in which the operator specified by the ID information is in charge of at least the production facilities M1 to M3.

As the display control unit 45 receives a screen scroll instruction by the operator or the like, the display control unit 45 displays a screen in which up/down and left/right scrolls have been made, on the display screen of the display device 22. Thus, the other facilities of which the operator was in charge, the operation state after T2 and the like can be displayed on the display screen.

Hereinafter, the preparation of each drawing data constituting the drawing data for data input will be described.

First, the display control unit 45 prepares drawing data related to a rectangular wave that enables visual discrimination of each information along the time series on the basis of the operation information and stop information for each production facility. Referring to FIG. 19, the display control unit 45 plots dots at the positions where the vertical axis is in the HIGH state with respect to the time included in the operation information and also plots dots at the positions where the vertical axis is in the LOW state with respect to the time included in the stop information. The display control unit 45 prepares drawing data to draw a line connecting the plotted dots along the time series. The display control unit 45 also prepares drawing data indicating the time base that represents time at predetermined intervals.

The display control unit 45 also prepares drawing data that causes the display device 22 to display a comment box (CB1 in FIG. 19) for inputting a stop cause of a production facility and a comment box (CB2 in FIG. 19) for inputting repair informations taken on the production facility. Here, the display control unit 45 prepares the drawing data so that the two comment boxes are arranged at the position corresponding to the drawing indicating a stop. Hereinafter, the comment box for inputting a stop cause is referred to as stop cause box, and the comment box for inputting repair informations is referred to as repair information box.

Moreover, the display control unit 45 prepares drawing data to display an identifier (for example, pattern) corresponding to the type of stop information (i.e., operator stop information, trouble stop information, carrying-out idle information or carrying-in idle information) at the position corresponding to the drawing representing each stop. In FIG. 19, in the case where a pattern is used as an identifier, and a rhombic pattern (♦) for operator stop information, a star-shaped pattern (★) for trouble stop information, a downward triangle pattern (▼) for carrying-out idle information, and an upward triangle pattern (▲) for carrying-in idle information are shown as exemplary display patterns. The pattern of each stop information may be of any shape as long as the patterns can be discriminated from each other.

The display control unit 45 also prepares drawing data so that, for each stop, an icon (ICON1 in FIG. 19) that is associated with video information at the time of stop and that can be clicked is arranged at the position corresponding to the drawing representing the stop. When it is detected that the icon is clicked on the basis of an input from the input device 21 (the display device 22 if the display device 22 is of a touch-panel type), the display control unit 45 displays a dynamic image of the video information of the predetermined time period related to the stop associated with this icon, on the display screen of the display device 22. The display position or size of the video information on the display screen is not particularly limited.

Moreover, the display control unit 45 prepares drawing data so that an icon (ICON2 in FIG. 19) that can be clicked for calling a setting screen to change the contents displayed on the input screen is arranged at a predetermined position on the input screen. Here, when it is detected that the icon is clicked on the basis of an input from the input device 21 or the like, the display control unit 45 switches the contents displayed on the display screen of the display device 22 to the setting screen. The setting screen is a screen for changing, for example, the charge time zone (time zone from the operation start time to the operation end time) or the like. An example of the setting screen will be described later.

As will be described in detail later, the display control unit 45 also prepares drawing data so that an icon (ICON3 in FIG. 19) that can be clicked to save information inputted to the information processing device 23 is arranged at a predetermined position on the input screen. Here, when information indicating that the icon is clicked is inputted to the information processing device 23 from the input device 21 or the like, the same information as the information temporarily stored in the memory 51a is sent to the main memory part 51b and this information is stored in the main memory part 51b. The main memory part 51b can be, for example, a hard disk drive.

Hereinafter, the icon that can be clicked to call the setting screen is referred to as setting icon, and the icon that can be clicked to save the information inputted to the information processing device 23 is referred to as save icon.

Next, the processing of information inputted by the operator will be described.

The stop cause receiving unit 46 receives input of stop cause information indicating a cause of stop of a production facility inputted via the input device 21, for each stop of each production facility. The stop cause receiving unit 46 sends the received stop cause information to the data association unit 41.

The data association unit 41 receives the stop cause information of each stop of each production facility from the stop cause information receiving unit 46. Here, the data association unit 41 associates the stop cause information with the association information stored in the memory 51a (i.e., information formed by associating each stop information with the video information of the time corresponding to each stop information) for each stop. When this association is ended, the data association unit 41 sends information indicating that the association is ended (first end information) to the display control unit 45.

When the first end information is received from the data association unit 41, the display control unit 45 prepares drawing data to display the stop cause information corresponding to each stop within the frame of each stop cause box on the display screen. This drawing data is sent to the display device 22 and a display based on the drawing data is made on the display screen.

The repair information receiving unit 47 receives input of repair information indicating repair informations taken for a stop inputted via the input device 21, for each stop of each production facility. The repair information receiving unit 47 sends the received repair information to the data association unit 41.

The data association unit 41 receives the repair information for each stop of each production facility from the repair information receiving unit 47. Here, the data association unit 41 associates the repair information with the associated information stored in the memory 51a (i.e., information formed by associating each stop information, the video information of the time corresponding to each stop information and each stop cause information) for each stop. When this association is ended, the data association unit 41 sends information indicating that the association is ended (second end information) to the display control unit 45.

When the second end information is received from the data association unit 41, the display control unit 45 prepares drawing data to display the repair information corresponding to each stop within the frame of each repair information box on the display screen. This drawing data is sent to the display device 22 and a display based on the drawing data is made on the display screen.

Figure 20:
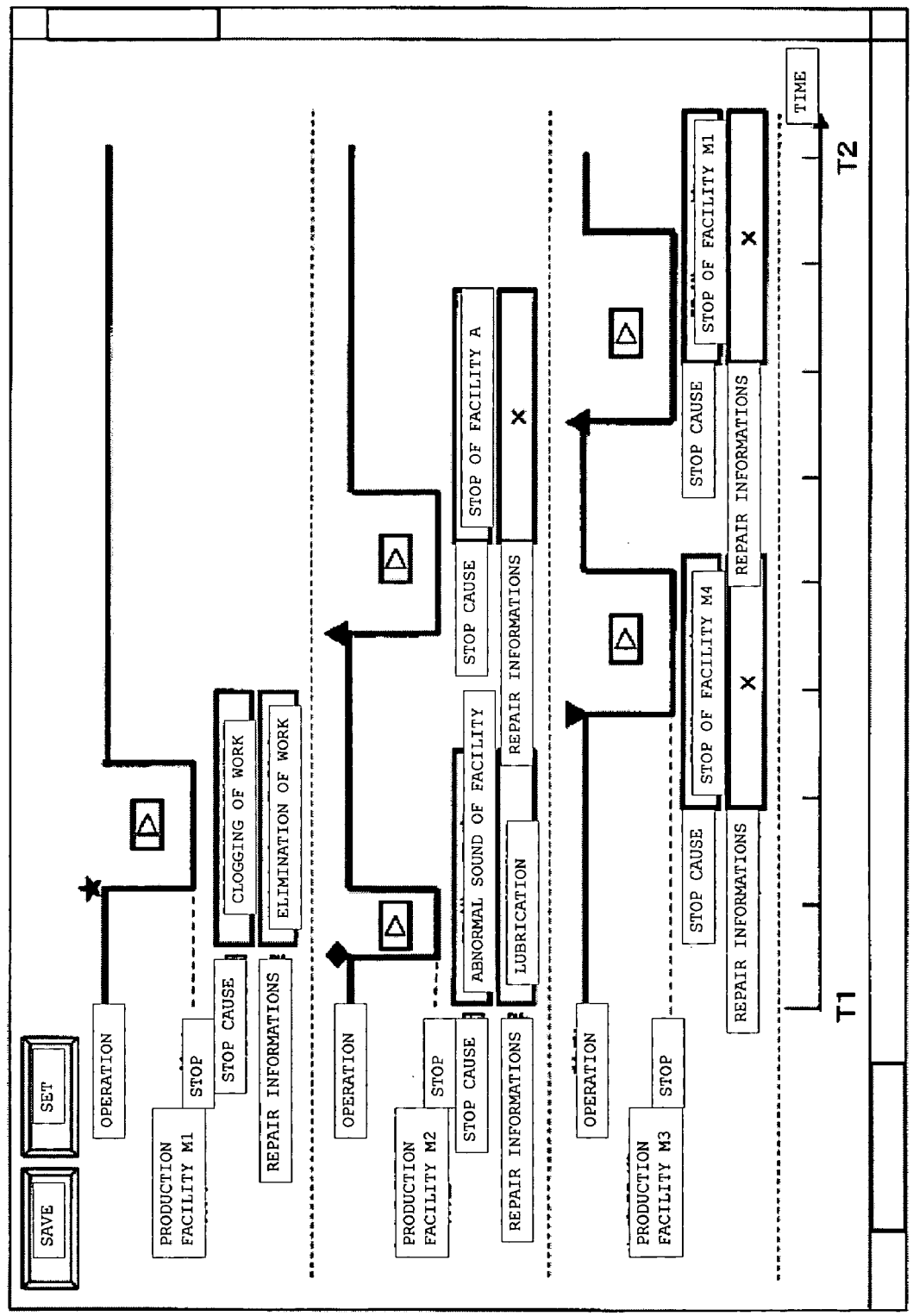
FIG. 20 shows the input screen after stop cause information and repair information are inputted.

FIG. 20 shows the input screen after the stop cause information and the repair information are inputted.

If the save icon on the display screen is clicked by the operator in the state where the stop cause information and/or the repair information are temporarily stored in the memory 51a, all the information that is temporarily stored in the memory 51a is stored into the main memory part 51b.

The judgment unit 48 judges whether the stop cause information is inputted or not in a storage area of the main memory part 51b set for the stop cause information to be inputted to the stop cause box, with respect to all the stop cause boxes. Moreover, the judgment unit 48 judges whether the repair information is inputted in a storage area of the main memory part 51b set for the repair information to be inputted to repair information box, with respect to all the repair information boxes.

If the judgment unit 48 judges that all the stop cause information and repair information are not inputted, the judgment unit 48 sends predetermined information to the display control unit 45 and the warning sound generating unit 49.

If the display control unit 45 receives the predetermined information from the judgment unit 48, the display control unit 45 prepares drawing data to display a warning on the display screen of the display device 22. In this case, on the basis of this drawing data, a warning is displayed on the display screen of the display device 22.

The warning sound generating unit 49 includes an amplifier and a speaker. If the warning sound generating unit 49 receives the predetermined information from the judgment unit 48, it generates a warning sound to the outside.

As the input of all the stop cause information and repair information is completed and the save icon is clicked, the series of input processing to the information processing device 23 with respect to the operator specified by the ID information is completed. Such processing is performed for each operator.

If the data sending unit 50 receives a predetermined instruction from the input device 21, the data sending unit 50 reads out the information stored in the device from the main memory part 51*b* and sends the read-out information to the output device 24. On receiving the information from the data sending unit 50, the output device 24 prints out the information in a list form.

Next, a case where the manager analyzes the specific operation by the operator after the input processing is completed will be described.

If the manager inputs information (instruction information) to instruct reading of data of a predetermined time period (for example, from time T3 to time T4) to the input device 21, this instruction information is sent to the display control unit 45. Here, the display control unit 45 acquires the associated information (information formed by associating each stop information, video information of the time corresponding to each stop information, each stop cause information and each repair information) with respect to the predetermined time indicated by the instruction information, from the main memory part 51*b*.

Figure 21:
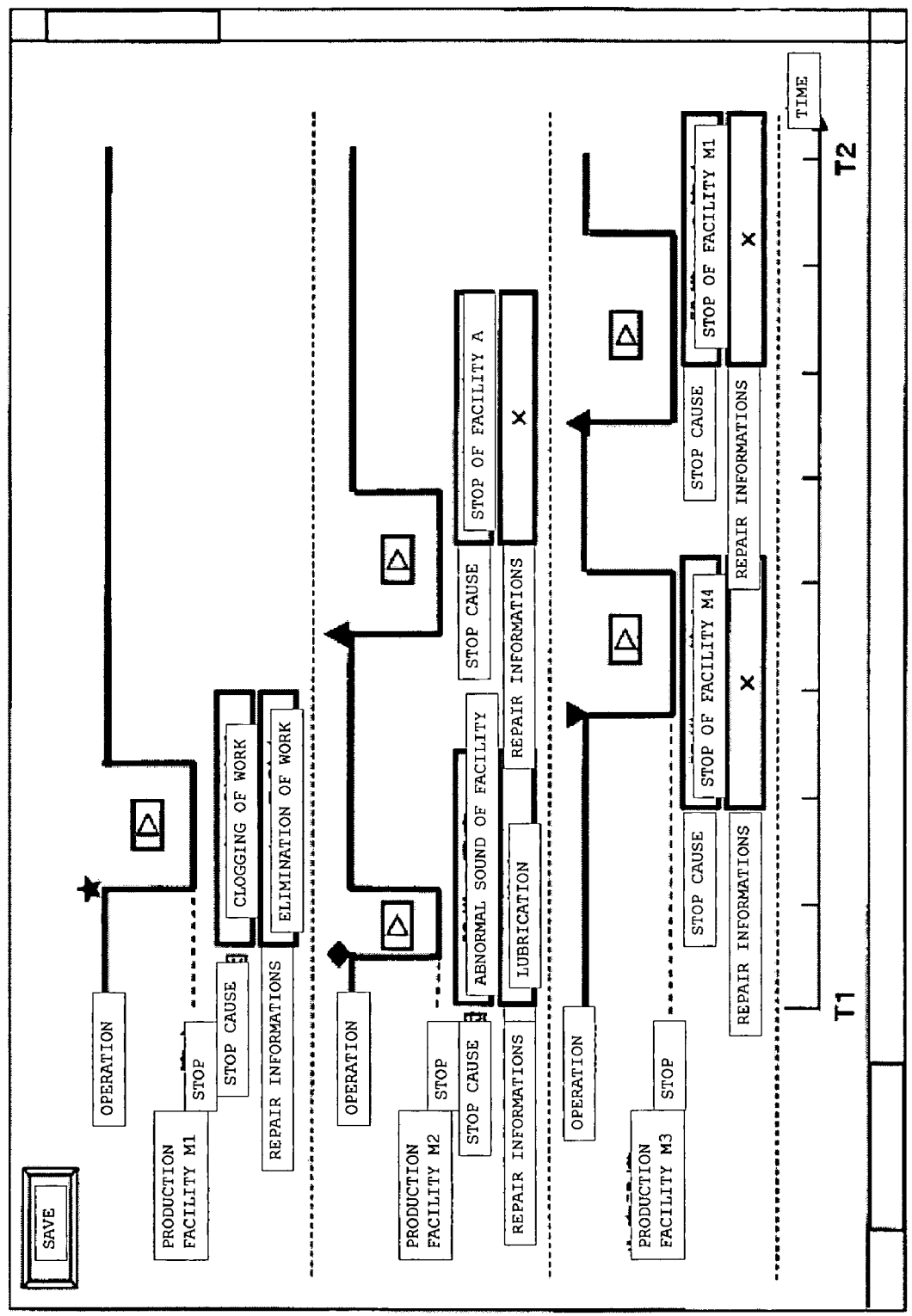
FIG. 21 shows an analysis screen shown in the case of analyzing a specific operation by an operator.

On the basis of the associated information, an analysis screen as shown in FIG. 21 is displayed on the display screen of the display device 22. The same display format as the input display screen is used except that no save icon is provided. That is, the operation states of plural production facilities are displayed along the time series on the display screen. Also a stop cause and repair informations are displayed on the display screen for each stop information. Moreover, a pattern (identifier) and an icon that is associated with the video information at the time of stop and that can be clicked are displayed.

If the manager inputs the ID information of an operator, the display control unit 45 may display information related to plural production facilities of which the operator specified by the ID information is in charge and the charge time zone when this operator is in charge of these production facilities, on the display screen of the display device 22 through the processing by the ID information receiving unit 43 and the charge information acquisition unit 44.

As described above, the information processing device 23 has: the operation state acquisition unit 40 that sequentially acquires operation information indicating operation of production facilities on a production line and stop information indicating stop of the facilities, for each production facility; the stop cause receiving unit 46 that receives input of stop cause information indicating a cause of stop of the production facilities, for each production facility; the data association unit (association unit) 41 that associates the stop cause information at least with the stop information and stores the operation information and the associated information to the storage unit 51; and the display control unit 45 that displays both the stored operation information and the associated information with respect to plural production facilities in time series on the display screen.

With this structure, the operation state acquisition unit 40 sequentially acquires operation information indicating operation of production facilities on a production line and stop information indicating stop of the facilities, for each production facility. The stop cause receiving unit 46 receives input of stop cause information indicating a cause of stop of the production facility, for each production facility. Moreover, the data association unit 41 associates the stop cause information at least with the stop information and stores the operation information and the associated information to the storage unit 51. Thus, the operation information, the stop information, and the stop cause information associated with the stop information are sequentially stored in the storage unit 51 for each production facility.

The display control unit 45 displays both the stored operation information and the associated information with respect to plural production facilities in time series on the display screen of the display device 22. Therefore, when analyzing the operation state of production facilities by using the stop cause information, a display along the time series related to the operation states of the plural production facilities can be made.

Therefore, with the information processing device 23, it can be judged how the stops of operation of the production facilities on the production line are interlocked with each other. Therefore, the analysis of the operation states of the production facilities is facilitated.

The information processing device 23 has the repair information receiving unit 47 that receives input of repair information indicating repair informations taken for the stop, for each production facility. The data association unit 41 further associates the repair information.

With this structure, the repair information receiving unit 47 receives input of repair information indicating repair informations taken for the stop. Moreover, the data association unit 41 associates the repair information. Thus, the stop cause information and the repair information are associated with the stop information. This also enables the display control unit 45 to also display the repair informations in time series on the display screen.

The information processing device 23 also has the video data acquisition unit 42 that acquires video information that represents videos of the area around the production facilities and that represents videos of the time corresponding to each stop information, from outside for each production facility. The data association unit 41 further associates the video information. If a predetermined instruction is received when receiving input of the stop cause information associated with the stop information, the display control unit 45 displays the video represented by the video information corresponding to the stop information.

With this structure, the video data acquisition unit 42 can acquire video information that represents videos of the area around the production facilities and that represents videos of the time corresponding to each stop information, from outside for each production facility. The data association unit 41 associates the video information. Thus, the stop cause information, the repair information and the video information are associated with the stop information. Moreover, if a predetermined instruction is received when receiving input of the stop cause information corresponding to the stop information, the display control unit 45 displays the video represented by the video information corresponding to the stop information.

Thus, the operator working at a production facility can watch a video indicated by video information corresponding to stop information by inputting a predetermined instruction to the information processing device when inputting stop cause information. Therefore, even in the case of inputting stop cause information after finishing his/her operation, the operator can input accurate stop cause information by watching the video.

In the information processing device 23, the operation state acquisition unit 40 acquires classification information indicating one of forced stop, trouble, carrying-in idle and carrying-out idle, as the stop information. When the stop cause receiving unit 46 receives stop cause information, the display control unit 45 displays an input area for stop cause information in association with a display area indicating each stop state on the display screen generated on the basis of each stop information, and displays identification information corresponding to the classification information in association with the display area.

With this structure, the operation state acquisition unit 40 can acquire classification information indicating one of forced stop, trouble, carrying-in idle and carrying-out idle, as the stop information. Also, when the stop cause receiving unit 46 receives stop cause information, the display control unit 45 displays an input area for stop cause information in association with a display area indicating each stop state on the display screen generated on the basis of each stop information, and displays identification information corresponding to the classification information in association with the display area.

Thus, when inputting stop cause information, the operator can refer to identification information corresponding to classification information. The operator can thus identify each stop as forced stop, trouble, carrying-in idle or carrying-out idle on the display screen. Therefore, even in the case of inputting stop cause information after finishing his/her operation, the operator can input accurate stop cause information.

The information processing device 23 also has the judgment unit 48 that judges whether input of the stop cause information associated with all the stop information is completed or not, as described above. If it is judged that the input is not completed, the display control unit 45 displays a predetermined warning on the display screen and the warning sound generating unit generates a warning sound. Therefore, failure to input the stop cause information by the operator can be prevented.

The information processing device 23 also has the ID information receiving unit (identification information receiving unit) 43 that receives input of identification information identifying operators, and the charge information acquisition unit 44 that acquires information indicating a production facility on the basis of the received ID information from the server unit 15 that associates and stores the ID information (identification information) identifying each operator with information indicating a production facility of which each operator is in charge, as described above. The display control unit 45 displays both the stored operation information and the associated information with respect to the production facility indicated by the acquired information, in time series on the display screen.

With this structure, the ID information receiving unit 43 receives input of ID information identifying operators. Also, the charge information acquisition unit 44 acquires information indicating a production facility on the basis of the received identification information from the server unit 15 that associates and stores the ID information identifying each operator with information indicating a production facility of which each operator is in charge.

Moreover, the display control unit 45 displays both the stored operation information and the associated information with respect to the production facility indicated by the acquired information, in time series on the display screen. In short, both the stored operation information and the associated information are displayed in time series on the display screen, with respect to the production facility of which the operator specified by the ID information is in charge.

Therefore, when this operator inputs at least stop cause information, the operation information of the other production facilities than the production facility of which the operator is in charge and the associated information are not displayed on the display screen. This enables the operator to quickly input information.

In the information processing device 23, charge time information indicating charge time when each operator is in charge of a production facility is further stored in the storage unit 15. The charge information acquisition unit 44 further acquires the charge time information on the basis of the received ID information, and the display control unit 45 displays both the stored operation information and the associated information with respect to a specified charge time, in time series on the display screen.

With this structure, charge time information indicating charge time when each operator is in charge of a production facility is further stored in the server unit 15, and the charge information acquisition unit 44 acquires the charge time information on the basis of the received identification information. Also, the display control unit 45 displays both the stored operation information and the associated information with respect to a specified charge time, in time series on the display screen.

Therefore, when this operator inputs at least stop cause information, the operation information of the other times than the time when the operator is in charge of the production facility and the associated information are not displayed on the display screen. This enables the operator to quickly input information.

Figure 22:
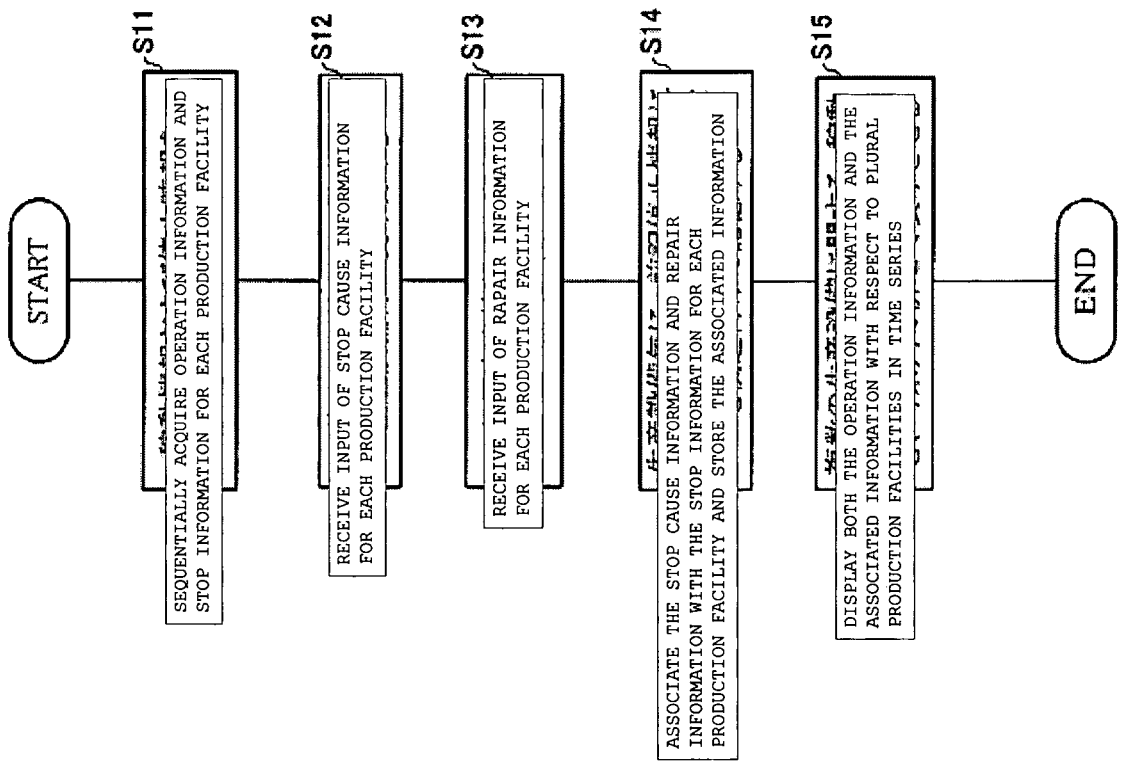
FIG. 22 is a flowchart showing a processing flow carried out in the information processing device.

The flow of processing carried out by the information processing device will now be described with reference to FIG. 22.

First, the operation state acquisition unit 40 sequentially acquires operation information and stop information for each production facility (S11). After S11, the stop cause receiving unit 46 receives input of stop cause information for each production facility (S12). After S12, the repair information receiving unit 47 receives input of repair information for each production facility (S13).

After S13, the data association unit 41 associates the stop cause information and the repair information with the stop information for each production facility and stores the associated information to the storage unit 51 (S14).

After S14, the display control unit 45 displays both the stored operation information and the associated information with respect to plural production facilities in time series on the display screen of the display device 22 (S15). The processing thus ends.

On a production line, if one production facility stops, the other production facilities stop, interlocked with the stop of the one production facility. For example, if the production facility M1 stops operation because of trouble stop or forced stop, no work is carried into the production facility M2 and the production facility M3. Therefore, the production facilities M2 and M3 stop operation when processing on the last work carried out from the production facility M1 before the stop of the production facility M1. In short, the production facilities M2 and M3 enter the carrying-in standby state.

Hereinafter, a production facility that stops because of trouble stop or forced stop will be also referred to as a stop real cause facility.

In such a case, with the above-described structure, an identifier of a pattern is displayed on the display screen to show what caused the stop of each production facility. However, with the display of a pattern, it is difficult to intuitively recognize how the stops of the production facilities are associated with each other.

Figure 23:
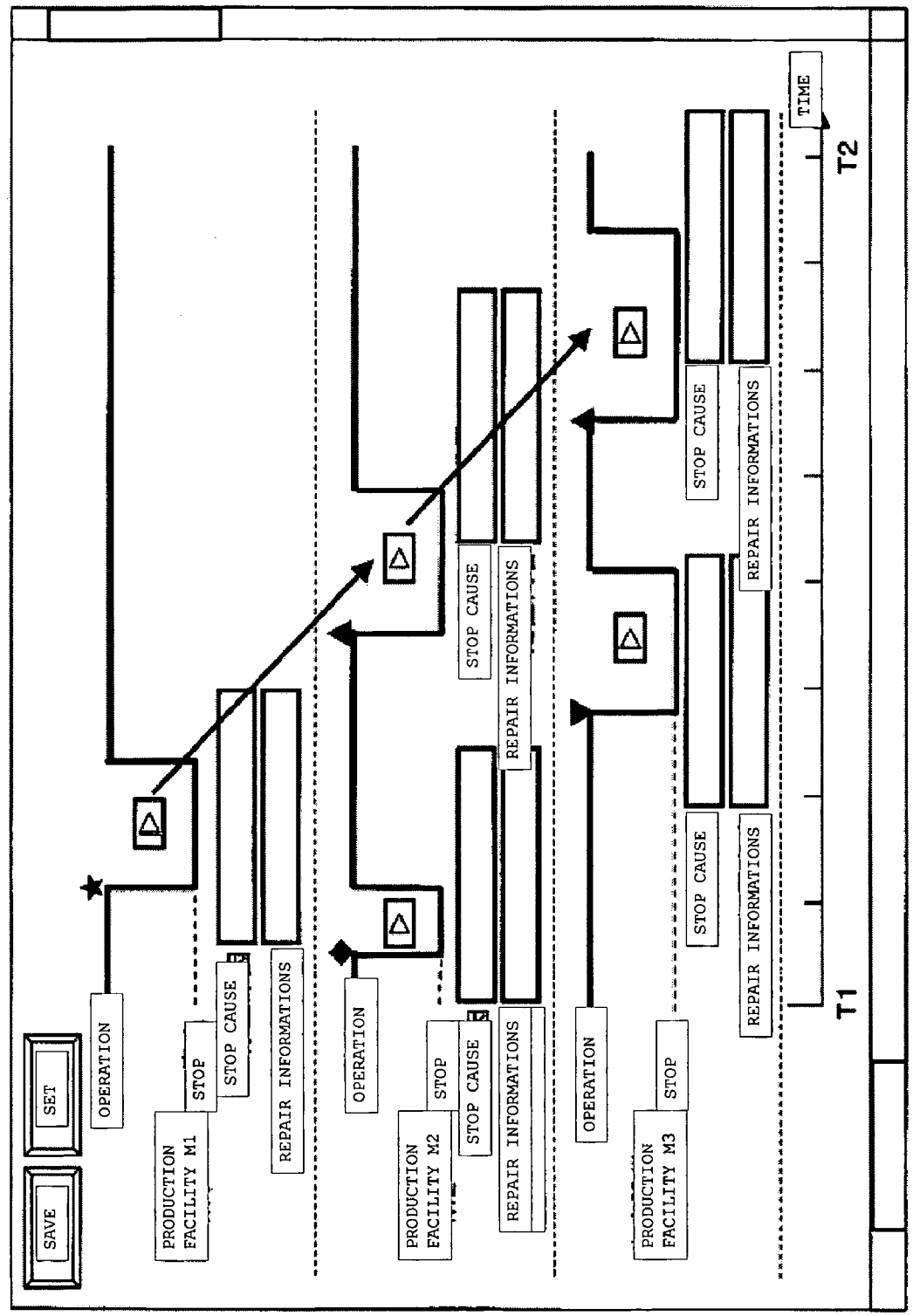
FIG. 23 shows the display screen in the case where associated stops are displayed in a manner of associating these stops among neighboring production facilities by using arrow display.

Therefore, it is preferred that the display control unit 45 prepares drawing data to display the associated stops in association with the neighboring production facilities on the display screen of the display device 22, for example, by using an arrow pattern (object). This structure enables display of an arrow pattern as shown in FIG. 23.

Which stops are associated with each other can be judged by judging what type of stop information exists for the stop of each production facility and the time when the stops occurred, in the neighboring production facilities. For example, such a technique is disclosed in JP-A-5-200657 (laid open on Aug. 10, 1993) and therefore will now be described further in detail here.

When such a structure is employed, and for example, on the assumption that the production facility M1 is the n-th production facility from the upstream side on the production line, in the information processing device 23, if the operation state acquisition unit 40 receives classification information indicating forced stop or trouble with respect to the n-th production facility from the upstream side on the production line and also receives classification information indicating carrying-in idle with respect to the (n+1)-th production facility from the upstream side, the data association unit 41 further associates the classification information indicating trouble with the classification information indicating carrying-in idle, and the display control unit 45 displays an object representing the association of the classification information indicating the forced stop or trouble with the classification information indicating carrying-in idle on the display screen.

With this structure, when the operation state acquisition unit 40 receives the classification information indicating forced stop or trouble with respect to the n-th production facility and receives the classification information indicating carrying-in idle with respect to the (n+1)-th production facility, the data association unit 41 further associates the classification information indicating the forced stop or trouble with the classification information indicating carrying-in idle. Also, the display control unit 45 displays an object representing the association of the classification information indicating the forced stop or trouble with the classification information indicating carrying-in idle on the display screen.

Thus, in the case where the operator inputs stop cause information, the operator can grasp more clearly the relation between a production facility that stopped on the basis of an instruction from outside or a production facility that stopped because of its own malfunction and a production facility that is downstream by one that stopped because of the influence of the stop, on the display screen. Also, in the case where the manager of the production line analyzes the operation state of the production facilities, the manager can grasp more clearly the relation between the production facility that stopped on the basis of an instruction from outside or the production facility that stopped because of its own malfunction and the production facility that is downstream by one that stopped because of the influence of the stop, on the display screen. Therefore, in any case, it is possible to grasp more clearly the relation between the production facility that stopped on the basis of an instruction from outside or the production facility that stopped because of its own malfunction and the production facility that is downstream by one that stopped because of the influence of the stop.

Also, in the information processing device 23, the operation state acquisition unit 40 receives classification information indicating carrying-in idle with respect to a production facility that is arranged downstream from the (n+1)-th production facility and arranged continuously from the (n+1)-th production facility.

With this structure, the operation state acquisition unit 40 receives the classification information indicating carrying-in idle with respect to the production facility that is arranged downstream from the (n+1)-th production facility and arranged continuously from the (n+1)-th production facility. Therefore, it is possible to grasp more clearly the relation between the production facility that stopped on the basis of an instruction from outside or the production facility that stopped because of its own malfunction and the plural downstream production facilities that stopped because of the influence of the stop.

Meanwhile, if the production facility M1 stops operation because of trouble stop or forced stop, no work can be carried out to the production facility M1 from the upstream production facility. As no work can be carried out from the upstream production facility, no work can be carried out from the production facility that is further upstream. Therefore, these upstream production facilities stop operation. In short, these production facilities enter the carrying-out standby state.

Again, it is preferred that the display control unit 45 prepares drawing data to display the associated stops in association with the neighboring production facilities on the display screen of the display device 22 by using an arrow pattern (object), as described above.

When such a structure is employed and, for example, on the assumption that the production facility M1 is the n-th production facility from the upstream side on the production line, in the information processing device 23, if the operation state acquisition unit 40 receives the classification information indicating forced stop or trouble with respect to the n-th production facility from the upstream side of the production line and receives the classification information indicating carrying-out idle with respect to the (n−1)-th production facility from the upstream side, the data association unit 41 further associates the classification information indicating the forced stop or trouble with the classification information indicating carrying-out idle, and the display control unit 45 displays an object representing the association of the classification information indicating the forced stop or trouble with the classification information indicating carrying-out idle on the display screen.

With this structure, when the operation state acquisition unit 40 receives the classification information indicating forced stop or trouble with respect to the n-th production facility and receives the classification information indicating carrying-out idle with respect to the (n−1)-th production facility, the data association unit 41 further associates the classification information indicating the forced stop or trouble with the classification information indicating carrying-out idle.

Thus, in the case where the operator inputs stop cause information, the operator can grasp more clearly the relation between a production facility that stopped on the basis of an instruction from outside or a production facility that stopped because of its own malfunction and a production facility that is upstream by one that stopped because of the influence of the stop, on the display screen. Also, in the case where a manager of the production line analyzes the operation state of the production facilities, the manager can grasp more clearly the relation between the production facility that stopped on the basis of an instruction from outside or the production facility that stopped because of its own malfunction and the production facility that is upstream by one that stopped because of the influence of the stop, on the display screen. Therefore, in any case, it is possible to grasp more clearly the relation between the production facility that stopped on the basis of an instruction from outside or the production facility that stopped because of its own malfunction and the production facility that is upstream by one that stopped because of the influence of the stop.

In the information processing device 23, the operation state acquisition unit 40 receives classification information indicating carrying-out idle with respect to the production facility that is arranged upstream from the (n−1)-th production facility and arranged continuously from the (n−1)-th production facility.

With this structure, the operation state acquisition unit 40 receives the classification information indicating carrying-out idle with respect to the production facility that is arranged upstream from the (n−1)-th production facility and arranged continuously from the (n−1)-th production facility. Therefore, it is possible to grasp more clearly the relation between the production facility that stopped on the basis of an instruction from outside or the production facility that stopped because of its own malfunction and the plural upstream production facilities that stopped because of the influence of the stop.

In the above-described embodiment, the different patterns are displayed at the positions corresponding to the drawings indicating the respective stops in accordance with the operator stop information, trouble stop information, carrying-out idle information and carrying-in idle information. However, the following structure may also be employed.

For example, instead of displaying the above-described patterns, the colors of the icon that is associated with video information at the time of stop and that can be clicked, stop cause box, repair information box, and/or, area where the waveform is recessed downward by the stop, may be changed in accordance with the operator stop information, trouble stop information, carrying-out idle information and carrying-in idle information. Moreover, the design of the recessed area may be changed. Any structure may be employed as long as a display is capable of helping discrimination among the operator stop information, trouble stop information, carrying-out idle information and carrying-in idle information.

In the above-described embodiment, the operator directly inputs stop cause information to the stop cause box. However, the input of stop cause information can be simplified by employing the following structure in the information processing device 23.

First, the stop cause receiving unit 46 acquires operator stop information, trouble stop information, carrying-out idle information and carrying-in idle information from the operation state acquisition unit 40. The acquired stop information is used for input to each stop cause box for each production facility.

That is, instead of the direct input of stop cause information by the operator using the input device 21, the information processing device 23 itself stores stop cause information and sends the display device 22 drawing data to display the stop cause information on the display screen, using the stop information acquired by the operation state acquisition unit 40 from the stop cause classifying device 20.

Here, the stop cause information to be displayed may be the very contents of the stop information (i.e., carrying-in idle or the like) or may be information associated in advance with each type of stop information and indicating the contents related to the stop information (for example, stop of other facilities or the like).

When the stop information is carrying-out idle information and carrying-in idle information, it is not necessary to take any repair informations on the production facility. Therefore, by employing a structure in which predetermined information (for example, x) is displayed in the repair information box corresponding to this stop information, the input can be simplified further.

Moreover, it is preferred that the stop cause information to be displayed can be changed by the operator on the setting screen. This structure will now be described with reference to FIG. 24.

On the setting screen, plural selective buttons (so-called radio buttons) are displayed on the basis of the drawing data prepared by the display control unit 45. On this screen, the operator selects either automatic input of a stop real cause facility or default input, by using the radio button.

When the stop real cause facility is selected, the very contents of the stop information, which are preset contents, or information indicating the contents related to the stop information is displayed in the stop cause box. When the stop information is carrying-out idle information and carrying-in idle information, the above-described predetermined information is displayed in the repair information box.

On the other hand, when default input is selected, whether the user directly inputs the stop cause information and repair information with respect to each of the carrying-in idle information, carrying-out idle information and operator stop information, is selected by the radio buttons.

If the radio button "ON" is pressed for each of the above-described stop information, the stop cause information and repair information that are preset by the operator for each stop information are displayed in the stop cause box and the repair information box, respectively. On the setting screen, the operator can individually set (input) the stop cause information and repair information. Thus, the operator can properly change the contents automatically displayed on the display screen in accordance with the type of stop information.

Figure 24:
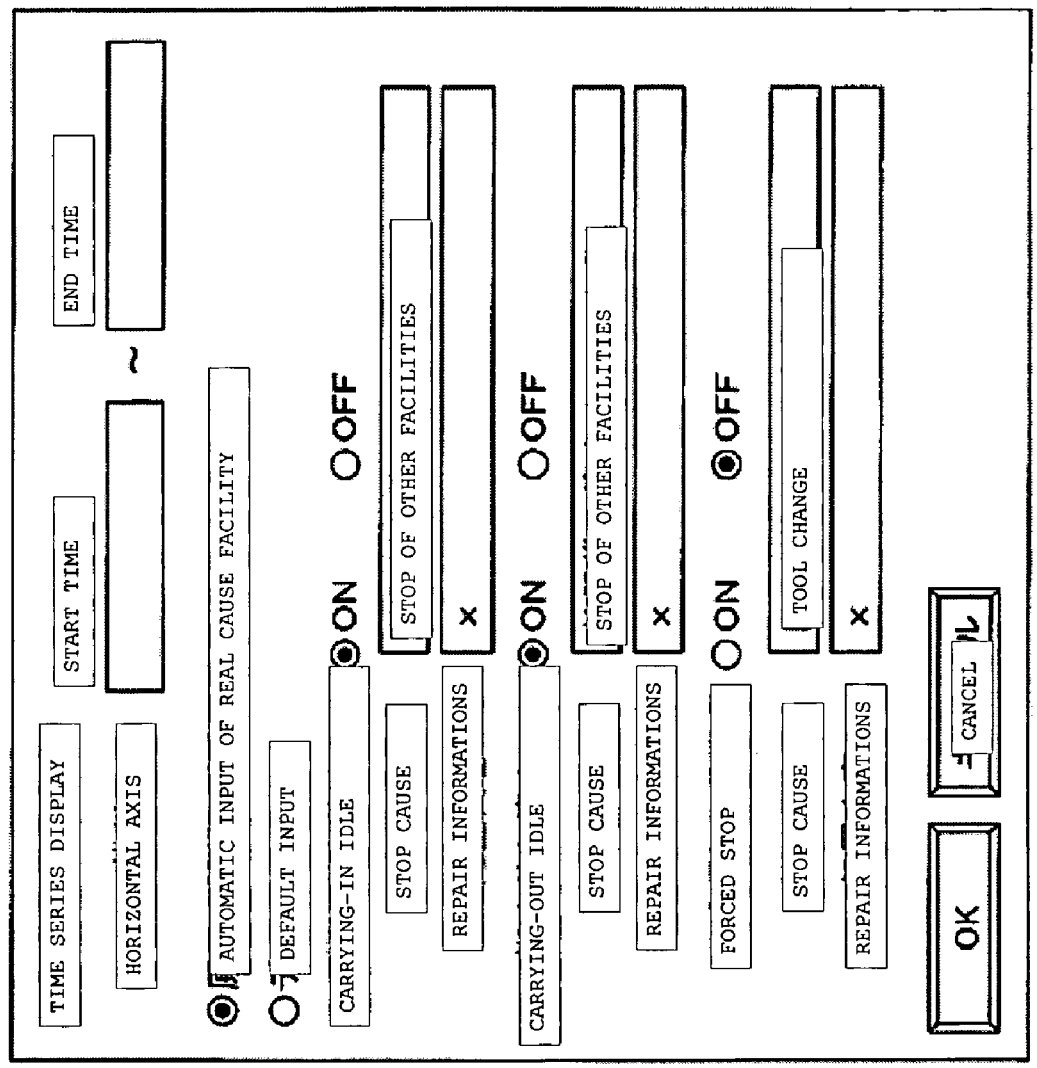
FIG. 24 shows a setting screen.

In FIG. 24, the state where automatic input of a stop real cause facility is selected is shown. Therefore, even if the radio buttons related to carrying-in idle (carrying-in idle information) and carrying-out idle (carrying-out idle information) are ON as shown in FIG. 24, the information inputted to the comment boxes for default input provided corresponding to these stops is not displayed on the display screen.

The setting screen also has a start time box and an end time box. By inputting the time in these boxes, the above-described charge time zone can be changed. Thus, the time zone that can be displayed on the display screen can be changed.

The setting screen also has an "OK" icon and a "CANCEL" icon. If the "OK" icon is selected, the display returns to the input screen and the contents set on the setting screen are displayed on the display screen.

With such a structure, in the information processing device 23, the operation state acquisition unit 40 acquires classification information indicating one of forced stop, trouble, carrying-in idle and carrying-out idle, as the stop information. The stop cause receiving unit 46 receives input of the classification information as the stop cause information. When receiving the stop cause information, the display control unit 45 displays an input area for stop cause information in association with each display area indicating a stop state on the display screen generated on the basis of each stop information, and displays information corresponding to the classification information in the input area.

With this structure, the operation state acquisition unit 40 can acquire classification information indicating one of forced stop, trouble, carrying-in idle and carrying-out idle, as the stop information. Also, the stop cause receiving unit 46 receives input of the classification information as the stop cause information. Moreover, when receiving the stop cause information, the display control unit 45 displays an input area for stop cause information in association with each display area indicating a stop state on the display screen generated on the basis of each stop information, and displays information corresponding to the classification information in the input area. In short, information corresponding to classification information is automatically inputted as stop cause information without being inputted by the operator. Therefore, the time and labor for inputting by the operator can be saved and accurate stop cause information can be inputted.

Moreover, by employing the following structure in the information processing device 23, the input of stop cause information can be simplified. Hereinafter, the information processing device with the modified structure is referred to as information processing device 23', as it is discriminated from the information processing device 23.

Figure 25:
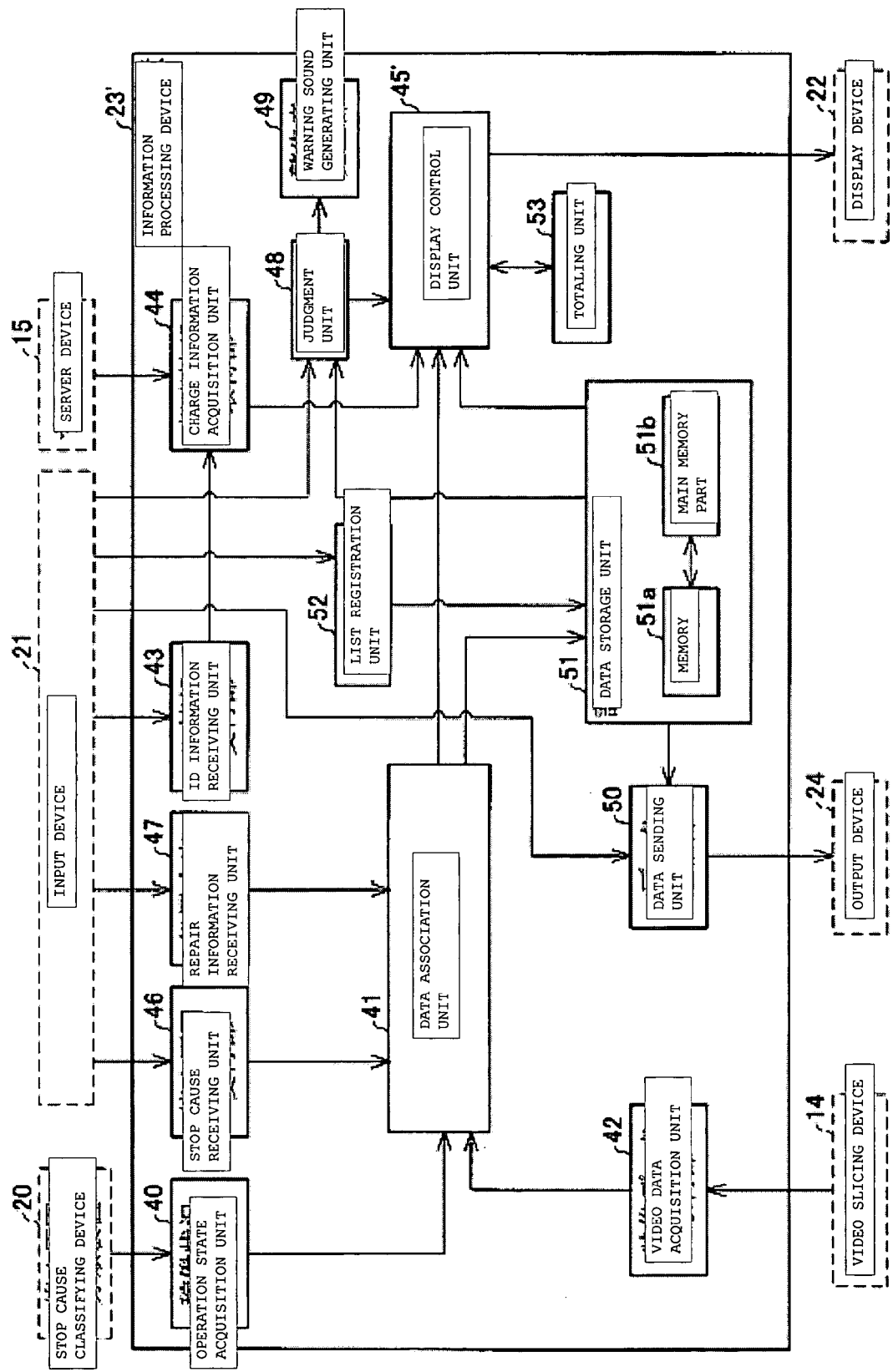
FIG. 25 is a block diagram showing another schematic structure of the information processing device.

FIG. 25 is a block diagram showing a schematic structure of the information processing device 23'. The information processing device 23' has an operation state acquisition unit 40, a data association unit 41, a video data acquisition unit 42, an ID information receiving unit 43, a charge information acquisition unit 44, a display control unit 45', a stop cause receiving unit 46, a repair information receiving unit 47, a judgment unit 48, a warning sound generating unit 49, a data sending unit 50, a storage unit 51, a list registration unit (registration unit) 52, and a totaling unit 53.

That is, compared with the above-described information processing device 23, the information processing device 23' has the display control unit of a different structure, and also has the list registration unit 52 and the totaling unit 53. Therefore, the display control unit 45', the list registration unit 52 and the totaling unit 53 will be mainly described hereinafter.

The list registration unit 52 receives input from the input device 21 and registers stop cause information and repair information in a list format to a main memory part 51b in advance. For example, before the actual input by the operator, the manager or operator registers the stop cause information and repair information to the main memory part 51b in advance.

The processing of input by the operator in the information processing device 23' will now be described.

Figure 26:
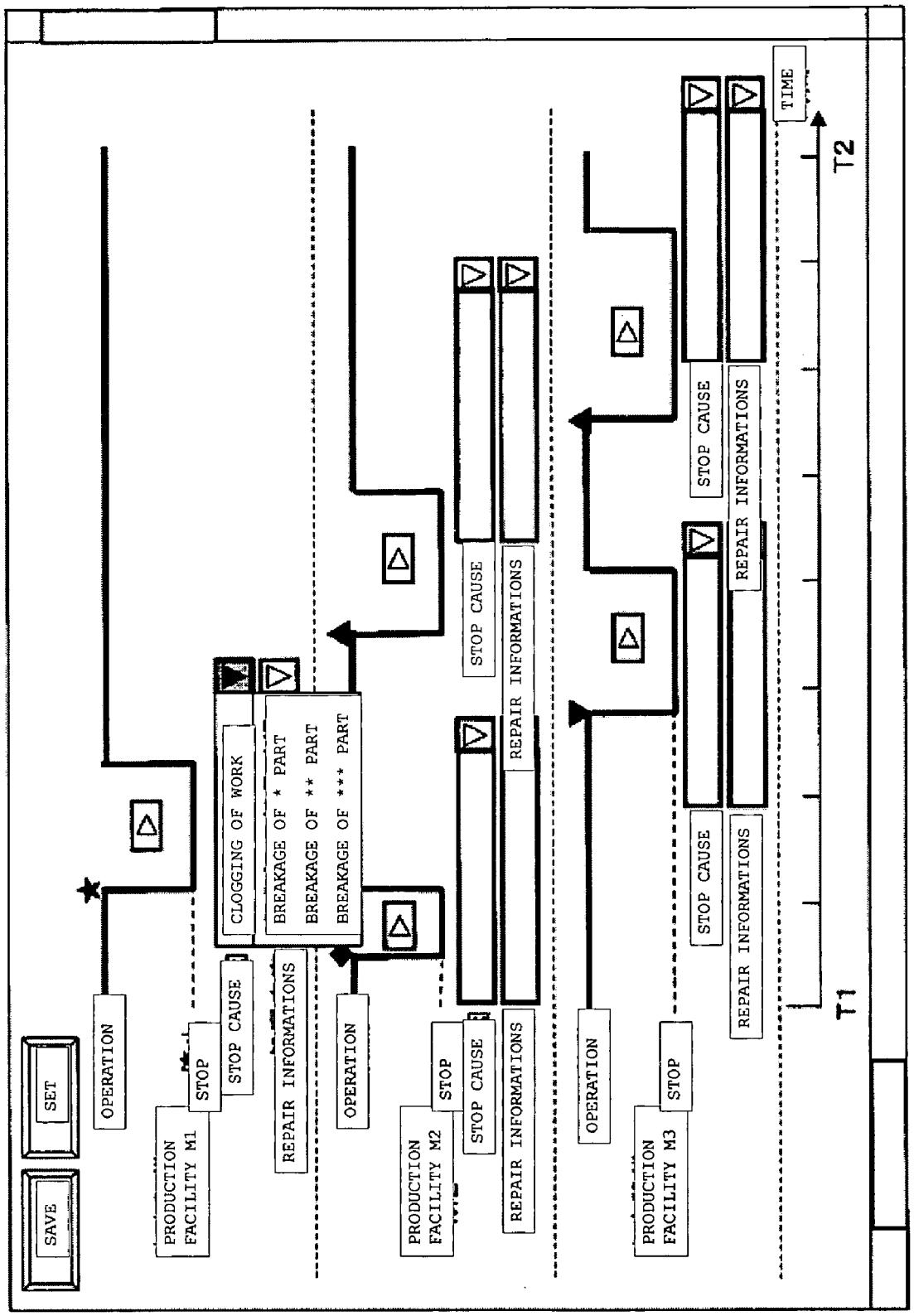
FIG. 26 shows the display screen in the case where pre-registered stop causes are displayed in a list.

As the operator clicks, for example, a list box display button appended by the side of the stop cause box on the display screen of the display device 22, the display control unit 45' prepares drawing data to display pre-registered stop causes in a list form by the side of the stop cause box. On the display screen of the display device 22, a screen as shown in FIG. 26 is displayed.

If, in this state, the operator selects certain stop cause information from the displayed list box via the input device 21 or the like, the display control unit 45' prepares drawing data to display this selected stop cause information in the stop cause box. The selected stop cause information is associated with each stop information and stored into the main memory part 51b. On the display screen of the display device 22, the selected stop cause information is displayed in the stop cause box.

Also, for the repair information, display in a list form and processing to select from the list are performed, as in the case of the stop cause information.

The totaling unit 53 totals the number of times the stop cause information and the repair information selected from the list box are selected, every time each information is selected. The totaling unit 53 then sends the information indicating the number of times of selection, to the display control unit 45'.

On receiving the information indicating the number of times of selection from the totaling unit 53, the display control unit 45' prepares drawing data to rearrange and display the stop cause information and repair information in the list box in order from the largest number of times of selection with respect to each information of each production facility. Thus, in the list box displayed on the display screen of the display device 22, the stop cause information and repair information are displayed in order from the largest number of times of selection.

Depending on the type of stop information, different stop cause information and repair information are usually selected. Thus, it is preferred that the contents corresponding to stop information are selected and displayed in the list. That is, it is preferred that different lists are displayed in accordance with each of the operator stop information, trouble stop information, carrying-out idle information and carrying-in idle information. This further facilitates the selection of stop cause information and repair information.

When such a structure is employed, in the information processing device 23, one or more pieces of stop cause information are stored in the storage unit 51 for each of the classification information, and if a predetermined instruction is received when receiving input of stop cause information associated with the stop information, the display control unit 45 displays a list of the stored pieces of stop cause information so that any of them can be selected.

With this structure, one or more pieces of stop cause information are stored in the storage unit 51 for each classification information. Also, if a predetermined instruction is received when receiving input of stop cause information associated with the stop information, the display control unit 45 displays a list of the stored pieces of stop cause information so that any of them can be selected. Therefore, the operator can easily input stop cause information by inputting the predetermined instruction.

The information processing device 23 also has a list registration unit (registration unit) 52 that registers stop cause information to the storage unit 51.

With this structure, the list registration unit 52 can register stop cause information to the storage unit 51. Therefore, the operator or manager can add new stop cause information.

The information processing device 23 also has a totaling unit 53 that totals the number of times the selected stop cause information is selected, for each production facility, and the display control unit 45 displays the stop cause information in order from the stop cause information that is selected the largest number of times, on the display screen when displaying a list.

With this structure, the totaling unit 53 totals the number of times the selected stop cause information is selected, for each production facility. Also, the display control unit 45 displays the stop cause information in order from the stop cause information that is selected the largest number of times, on the display screen when displaying a list. In short, the stop cause information is displayed in order from the stop cause information selected most frequently by the operator. Therefore, the operator can select stop cause information more quickly than in the case where the stop cause information is not arranged in order from the stop cause information that is selected the largest number of times.

In the information processing device 23, information indicating one or more pieces of repair information are stored in the storage unit 51 for each of the classification information, and if a predetermined instruction is received when receiving input of repair information associated with the stop information, the display control unit 45 displays a list of the stored pieces of repair information so that any of them can be selected.

With this structure, one or more pieces of repair information are stored in the storage unit 51 for each classification information. Also, if a predetermined instruction is received when receiving input of repair information associated with the stop information, the display control unit 45 displays a list of the stored pieces of repair information so that any of them can be selected. Therefore, the operator can easily input repair information by inputting the predetermined instruction.

The information processing device 23 also has a list registration unit 52 that registers repair information to the storage unit 51.

With this structure, the list registration unit 52 can register repair information to the storage unit 51. Therefore, the operator or manager can add new repair information.

The information processing device 23 also has a totaling unit 53 that totals the number of times the selected repair information is selected, for each production facility, and the display control unit 45 displays the repair information in order from the repair information that is selected the largest number of times, on the display screen when displaying a list.

With this structure, the totaling unit 53 totals the number of times the selected repair information is selected, for each production facility. Also, the display control unit 45 displays the repair information in order from the repair information that is selected the largest number of times, on the display screen when displaying a list. In short, the repair information is displayed in order from the repair information selected most frequently by the operator. Therefore, the operator can select repair information more quickly than in the case where the repair information is not arranged in order from the repair information that is selected the largest number of times.

In the above-described embodiment, videos are acquired from the video camera. However, the function of audio input of the video camera may be used to acquire sounds as well as the videos. Alternatively, it is possible to acquire only sounds instead of videos.

This invention is not limited to the above-described embodiment and various changes and modifications can be made without departing from the scope of the claims. That is, the technical field of this invention also includes embodiments constituted by combining technical measures that are properly changed within the scope of the claims.

Each unit (except for the storage unit 51) of the information processing device 23 and each processing step in the above-described embodiment can be realized by executing a program stored in a storage unit such as read-only memory (ROM) or RAM by an arithmetic unit such as CPU, and thus controlling an input unit such as keyboard, an output unit such as display, or a communication unit such as interface circuit. Therefore, as the computer having these units simply reads the storage medium storing the program and executes the program, various functions and various processing of the information processing device 23 (except for the storage unit 51) of the embodiment can be realized. Also, if the program is stored on a removable storage medium, the various functions and various processing can be realized on an arbitrary computer.

The storage medium may be a memory, not shown, for performing processing on a microcomputer, for example, a program medium such as ROM, or a program medium that can be read when inserted in a program reader device as an external storage device, not shown.

In any case, it is preferred that the stored program is to be accessed and executed by a microprocessor. Moreover, it is preferred that the program is read out and that the read-out program is downloaded to a program storage area of the microcomputer where the program is executed. The program for download is stored in the main body device in advance.

The program medium may also be a storage medium that can be separated from the main body, for example, a tape medium such as magnetic tape or cassette tape, a disk medium such as magnetic disk including flexible disk or hard disk, or CD, MO, MD or DVD, a card medium such as IC card (including memory card), or a storage medium that carries the program in a fixed manner, including a semiconductor memory such as mask ROM, erasable programmable read-only memory (EPROM), electrically erasable programmable read-only memory (EEPROM) or flash ROM.

In a system structure that can be connected to a communication network including the Internet, it is preferred that a storage medium that dynamically carries a program is used so that the program is downloaded from the communication network.

Moreover, when downloading the program from the communication network in this manner, it is preferred that the program for download is stored in the main body device in advance or installed from a separate storage medium.

This invention can be applied to analysis of the operation states of production facilities on a production line and to input of analysis data.

What is claimed is:

1. An information processing device comprising:
   an operation state acquisition unit that sequentially acquires operation information indicating operation of a production facility on a production line and stop information indicating stop of the facility, for each production facility;
   a stop cause receiving unit that receives input of stop cause information indicating a cause of stop of the production facility, for each production facility;
   an association unit that associates the stop cause information at least with the stop information and stores the operation information and the associated information into a storage unit;
   a display control unit that displays both the stored operation information and the associated information with respect to plural production facilities in time series on a single display screen;
   a video information acquisition unit that acquires video information indicating a video of the area around the production facility and of a time corresponding to each of the stop information, from outside for each production facility; and a repair information receiving unit that receives input repair information indicating repair information to deal with the stop, for each production facility, wherein the association unit further associates the repair information, wherein the association unit further associates the video information, and if a predetermined instruction is received when receiving input of the stop cause information associated with the stop information, the display control unit displays a video indicated by video information corresponding the stop information.

2. The information processing device as claimed in claim 1, wherein the operation state acquisition unit acquires classification information indicating one of forced stop, trouble, carrying-in idle and carrying-out idle, as the stop information, wherein the forced stop is the stop of the facility based on an instruction from outside, the trouble is the stop based on malfunction of the facility, the carrying-in idle is the stop based on standby state for carrying-in of a work, and the carrying-out idle is the stop based on standby state for carrying-out of a work, and wherein when the stop cause receiving unit receives stop cause information, the display control unit displays an input area for stop cause information in association with a display area indicating each stop state on the display screen generated on the basis of each stop information, and displays identification information corresponding to the classification information in association with the display area.

3. The information processing device as claimed in claim 1, wherein the operation state acquisition unit acquires classification information indicating one of forced stop, trouble, carrying-in idle and carrying-out idle, as the stop information, where the forced stop is the stop of the facility based on an instruction from outside, the trouble is the stop based on malfunction of the facility, the carrying-in idle is the stop based on standby state for carrying-in of a work, and the carrying-out idle is the stop based on standby state for carrying-out of a work, and wherein the stop cause receiving unit receives input of the classification information as the stop cause information, and when receiving the stop cause information, the display control unit displays an input area for stop cause information in association with each display area indicating a stop state on the display screen generated on the basis of each stop information, and displays information corresponding to the classification information in the input area.

4. The information processing device as claimed in claim 2, wherein when the operation state acquisition unit receives the classification information indicating forced stop or trouble with respect to an n-th production facility from the upstream side of the production line and receives the classification information indicating carrying-in idle with respect to an (n+1)-th production facility from the upstream side, the association unit further associates the classification information indicating the forced stop or trouble with the classification information indicating carrying-in idle, and the display control unit displays an object representing the association of the classification information indicating the forced stop or trouble with the classification information indicating carrying-in idle on the display screen.

5. The information processing device as claimed in claim 4, wherein the operation state acquisition unit receives classification information indicating carrying-in idle with respect to a production facility that is arranged downstream from the (n+1)-th production facility and arranged continuously from the (n+1)-th production facility.

6. The information processing device as claimed in claim 2, wherein when the operation state acquisition unit receives the classification information indicating forced stop or trouble with respect to an n-th production facility from the upstream side of the production line and receives the classification information indicating carrying-out idle with respect to an (n−1)-th production facility from the upstream side, the association unit further associates the classification information indicating the forced stop or trouble with the classification information indicating carrying-out idle, and the display control unit displays an object representing the association of the classification information indicating the forced stop or trouble with the classification information indicating carrying-out idle on the display screen.

7. The information processing device as claimed in claim 6, wherein the operation state acquisition unit receives classification information indicating carrying-out idle with respect to a production facility that is arranged upstream from the (n−1)-th production facility and arranged continuously from the (n−1)-th production facility.

8. The information processing device as claimed in claim 2, wherein one or more pieces of stop cause information are stored in the storage unit for each of the classification information, and if a predetermined instruction is received when receiving input of stop cause information associated with the stop information, the display control unit displays a list of the stored pieces of stop cause information so that any of them can be selected.

9. The information processing device as claimed in claim 8, wherein the information processing device comprises a registration unit that registers the stop cause information to the storage unit.

10. The information processing device as claimed in claim 8, comprising a totaling unit that totals the number of times the selected stop cause information is selected, for each production facility, wherein the display control unit displays the stop cause information in order from the stop cause information that is selected the largest number of times, on the display screen when displaying a list.

11. The information processing device as claimed in claim 4, wherein information indicating one or more pieces of repair information are stored in the storage unit for each of the classification information, and if a predetermined instruction is received when receiving input of repair information associated with the stop information, the display control unit displays a list of the stored pieces of repair information so that any of them can be selected, and the information processing device comprises a registration unit that registers repair information to the storage unit.

12. The information processing device as claimed in claim 11, comprising a totaling unit that totals the number of times the selected repair information is selected, for each production facility, wherein the display control unit displays the repair information in order from the repair information that is selected the largest number of times, on the display screen when displaying a list.

13. The information processing device as claimed in claim 1, comprising a judgment unit that judges whether input of the stop cause information associated with all the stop information is completed or not, wherein if it is judged that the input is not completed, the display control unit displays a predetermined warning on the display screen.

14. The information processing device as claimed in claim 1, comprising a judgment unit that judges whether input of the stop cause information associated with all the stop information is completed or not, and a warning sound generating unit that generates a warning sound if it is judged that the input is not completed.

15. An operation state management device comprising the information processing device as claimed in claim 2, and a classification information generation device that generates the classification information on the basis of the operation information and the stop information and sends the generated classification information to the information processing device.

16. An information processing device comprising:

an operation state acquisition unit that sequentially acquires operation information indicating operation of a production facility on a production line and stop information indicating stop of the facility, for each production facility;

a stop cause receiving unit that receives input of stop cause information indicating a cause of stop of the production facility, for each production facility;

an association unit that associates the stop cause information at least with the stop information and stores the operation information and the associated information into a storage unit;

a display control unit that displays both the stored operation information and the associated information with respect to plural production facilities in time series on a single display screen;

an identification information receiving unit that receives input of identification information identifying operators, and a charge information acquisition unit that acquires information indicating a production facility on the basis of the received identification information from a server unit that associates and stores the identification information identifying each operator with information indicating a production facility of which each operator is in charge, wherein the display control unit displays both the stored operation information and the associated information with respect to the production facility indicated by the acquired information, in time series on the display screen.

17. The information processing device as claimed in claim 16, wherein the server unit charges time information indicating charge time when each operator is in charge of a production facility is further stored, the charge information acquisition unit further acquires the charge time information on the basis of the received identification information, and the display control unit displays both the stored operation information and the associated information with respect to a specified charge time, in time series on the display screen.

* * * * *